US009909670B2

(12) United States Patent
Heiderman et al.

(10) Patent No.: US 9,909,670 B2
(45) Date of Patent: Mar. 6, 2018

(54) MODIFIED VACUUM ACTUATED VALVE ASSEMBLY AND SEALING MECHANISM FOR IMPROVED FLOW STABILITY FOR FLUIDS SUB-ATMOSPHERICALLY DISPENSED FROM STORAGE AND DELIVERY SYSTEMS

(71) Applicants: Douglas C. Heiderman, Akron, NY (US); Ashwini K. Sinha, East Amherst, NY (US); Paul Crvelin, Grand Island, NY (US); Andrew Vassallo, Lancaster, NY (US)

(72) Inventors: Douglas C. Heiderman, Akron, NY (US); Ashwini K. Sinha, East Amherst, NY (US); Paul Crvelin, Grand Island, NY (US); Andrew Vassallo, Lancaster, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 202 days.

(21) Appl. No.: 14/638,397

(22) Filed: Mar. 4, 2015

(65) Prior Publication Data

US 2016/0258537 A1 Sep. 8, 2016

(51) Int. Cl.
*F16K 31/12* (2006.01)
*F16K 1/36* (2006.01)
(Continued)

(52) U.S. Cl.
CPC ............... *F16K 1/36* (2013.01); *F16K 1/303* (2013.01); *F17C 13/04* (2013.01);
(Continued)

(58) Field of Classification Search
CPC ......... Y10T 137/7897; Y10T 137/7781; F16K 1/36; F16K 1/303; F17C 13/04; G05D 16/0622
See application file for complete search history.

(56) References Cited

U.S. PATENT DOCUMENTS 1,576,608 A * 3/1926 Helphingstine ........... F24D 1/00
137/157
3,366,315 A * 1/1968 Alberani ............. F04D 27/0207
251/28
(Continued)

FOREIGN PATENT DOCUMENTS

JP          S 5714915 A      1/1982
WO       WO 0181822 A1    11/2001
(Continued)

*Primary Examiner* — Jessica Cahill
(74) *Attorney, Agent, or Firm* — Nilay S. Dalal

(57) ABSTRACT

A modified vacuum actuated valve assembly and sealing mechanism is provided for improved sub-atmospheric flow stability characterized by the absence of delivery pressure spikes and flow excursions. The valve assembly includes a non-stationary thermoplastic seat and a stabber. The stabber is characterized by a top portion having a circular periphery designed to mechanically engage and disengage with an inner sealing surface of the thermoplastic seat. The sealing surface is coined to eliminate surface irregularities contained therein, thereby producing a relatively smooth coined mating inner sealing surface for the circular top portion of the stabber. The valve assembly also includes a modified bellows capable of fine tuning the delivery pressure of the valve assembly.

22 Claims, 25 Drawing Sheets

Closed position

(51) Int. Cl.
    *F17C 13/04*         (2006.01)
    *G05D 16/06*        (2006.01)
    *F16K 1/30*          (2006.01)

(52) U.S. Cl.
    CPC .. *G05D 16/0622* (2013.01); *F17C 2201/0114* (2013.01); *F17C 2201/058* (2013.01); *F17C 2203/0617* (2013.01); *F17C 2205/0329* (2013.01); *F17C 2205/0338* (2013.01); *F17C 2205/0385* (2013.01); *F17C 2205/0391* (2013.01); *F17C 2205/0394* (2013.01); *F17C 2221/037* (2013.01); *F17C 2223/0123* (2013.01); *F17C 2223/0153* (2013.01); *F17C 2223/033* (2013.01); *F17C 2223/036* (2013.01); *F17C 2225/0123* (2013.01); *F17C 2225/038* (2013.01); *F17C 2270/0518* (2013.01)

(56) References Cited

U.S. PATENT DOCUMENTS

| | | | | |
|---|---|---|---|---|
| 4,124,195 | A | * | 11/1978 | Braun ................ F16K 1/42 251/333 |
| 4,793,379 | A | | 12/1988 | Eidsmore |
| 4,815,692 | A | * | 3/1989 | Loiseau ............... F16K 1/302 251/14 |
| 5,303,734 | A | * | 4/1994 | Eidsmore ......... G05D 16/0616 137/505.43 |
| 5,575,311 | A | * | 11/1996 | Kingsford ........... F16K 11/022 137/625.5 |
| 5,937,895 | A | * | 8/1999 | Le Febre ............... F16K 1/305 137/494 |
| 6,007,609 | A | | 12/1999 | Semerdjian et al. |
| 6,045,115 | A | | 4/2000 | Martin, Jr. et al. |
| 6,089,027 | A | | 7/2000 | Wang et al. |
| 6,101,816 | A | | 8/2000 | Wang et al. |
| 6,857,447 | B2 | | 2/2005 | Olander et al. |
| 6,959,724 | B2 | | 11/2005 | Heiderman |
| 7,708,028 | B2 | | 5/2010 | Brown et al. |
| 7,905,247 | B2 | | 3/2011 | Campeau |
| 2004/0107997 | A1 | | 6/2004 | Tom et al. |
| 2007/0261746 | A1 | * | 11/2007 | Nomichi ................ F16K 1/443 137/625.48 |
| 2010/0317276 | A1 | * | 12/2010 | Bracker ................ F16K 17/06 454/74 |
| 2012/0091385 | A1 | * | 4/2012 | Nebel ...................... F16K 1/42 251/359 |
| 2013/0068987 | A1 | * | 3/2013 | Sun ........................... F16K 1/42 251/359 |
| 2014/0179090 | A1 | * | 6/2014 | Sinha ...................... C23C 14/34 438/514 |
| 2014/0231693 | A1 | * | 8/2014 | Terashima ............. F16K 25/00 251/333 |

FOREIGN PATENT DOCUMENTS

| | | | | |
|---|---|---|---|---|
| WO | WO 0212766 | A1 | * 2/2002 | ............ F16K 1/36 |
| WO | WO 2014/047522 | A1 | 3/2014 | |

\* cited by examiner

Closed position

Open position

Standard o-ring assembly

Standard pin/poppet assembly

Pre coining

During coining

Post coining

Elastic zone

Open state

Closed state

Flow Spike – Two Possible Mechanism

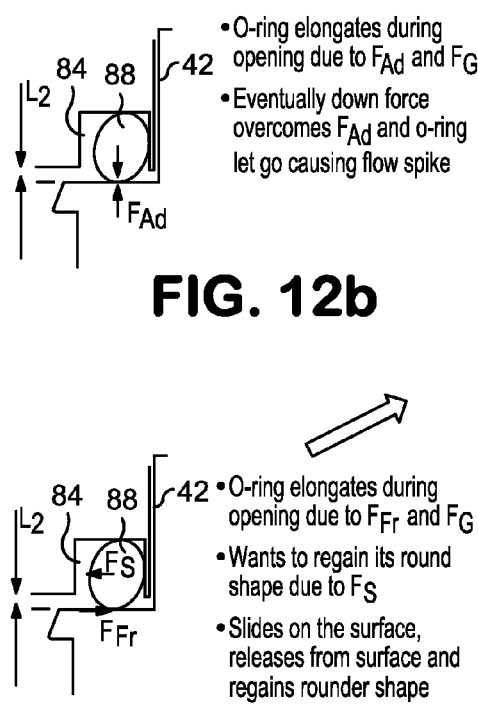

FIG. 12a
- O-ring in a deformed shape close to square

FIG. 12b
- O-ring elongates during opening due to $F_{Ad}$ and $F_G$
- Eventually down force overcomes $F_{Ad}$ and o-ring let go causing flow spike FIG. 12c
- O-ring elongates during opening due to $F_{Fr}$ and $F_G$
- Wants to regain its round shape due to $F_S$
- Slides on the surface, releases from surface and regains rounder shape FIG. 12d
- Flow steadies at $L_3 < L_2$
- Delivery pressure spike New Bellows Bellows of the current art Bellows of the current art Isometric View

MODIFIED VACUUM ACTUATED VALVE ASSEMBLY AND SEALING MECHANISM FOR IMPROVED FLOW STABILITY FOR FLUIDS SUB-ATMOSPHERICALLY DISPENSED FROM STORAGE AND DELIVERY SYSTEMS

FIELD OF INVENTION

The present invention relates to a storage and delivery system having a modified and improved vacuum-actuated valve assembly to prevent the discharge of fluid from a vessel, such as a pressurized cylinder or tank and dispense the fluid upon application of a predetermined vacuum condition existing on the downstream side of the valve assembly.

BACKGROUND

Industrial processing and manufacturing applications require the use of highly toxic fluids. The manufacture of semiconductor materials represents one such application wherein the safe storage and handling of highly toxic hydride or halide gases and mixtures thereof becomes necessary. Examples of such gases include silane, germane, ammonia, phosphine, arsine, boron trifluoride, stibine, hydrogen sulfide, hydrogen selenide, hydrogen telluride, phosphorous trifluoride, arsenic pentafluoride and other halide or hydride compounds and gas mixtures thereof. As a result of toxicity and safety considerations, these gases must be carefully stored and handled in the industrial process facility. The semiconductor industry in particular relies on various gaseous sources, such as, for example, arsine ($AsH_3$) and phosphine ($PH_3$), hydrogen selenide (H2Se), boron triflouride ($BF_3$), diborane (B2H6), silicon tetrafluoride ($SiF_4$), germanium tetrafluoride (GeF4), selenium hexafluoride (SeF6), carbon monoxide (CO) and carbon dioxide (CO2) as sources of arsenic (As), phosphorus (P), boron (B), silicon (Si), germanium (Ge), selenium (Se) and carbon (C) in ion implantation. Ion implantation systems typically use pure gases such as $AsH_3$ and $PH_3$ stored as liquefied compressed gases at their respective vapor pressures and pure gases such as $BF_3$ and $SiF_4$ stored at pressures as high as 1500 psig within the delivery vessel. Due to their extreme toxicity and high vapor pressure, their use, transportation and storage raise significant safety concerns for the semiconductor industry.

To address the various safety concerns, there have been a number of systems developed to deliver these hydride and halide compounds to the ion implant tool at sub-atmospheric conditions. End-users flow rates typically will range from about 0.1-10 sccm. Device safety requires delivery of the gas at sub-atmospheric pressures so that if the valve opens to atmosphere, nothing will leak out of cylinder. A vacuum condition must be applied to the cylinder to obtain flow of gas. As such, a fail-safe vacuum-actuated valve design is required.

For example, a chemical system, known as SDS™ and commercialized by ATMI, Inc. involves filling a compressed gas cylinder with a physical adsorbent material, and reversibly adsorbing the dopant gases onto the material. The desorption process involves applying a vacuum or heat to the adsorbent material/cylinder. In practice, vacuum from the ion implanter is used to desorb the gas from the solid-phase adsorbent. There are certain limitations associated with the SDS technology, and they include the following: 1) the adsorbent material has a finite loading capacity thereby limiting the amount of product available in a given size cylinder; 2) the desorption process can be initiated by exposing the cylinder package to heat, thereby causing the cylinders to reach and deliver gases at atmospheric and super-atmospheric pressures when the cylinder is exposed to temperatures greater than 70° F., which are common in many cylinder warehouse locations and within the ion implant tool; 3) the purity of the gas delivered from the cylinder can be compromised due to adsorption/desorption of the other materials/gases on the adsorbent material; 4) cylinder utilization is influenced by the depth of vacuum applied to the package, such that cylinders can often be returned with appreciable unused product remaining in the package; and 5) adsorbent attrition can lead to particulate contamination in the gas delivery system.

Separately, a number of mechanical systems have been developed for the sub-atmospheric delivery of dopant gases. Some involve the use of a pressure regulator, while others require valve devices to control and deliver the product sub-atmospherically. These devices are set to deliver or open when sub-atmospheric or vacuum conditions are applied to the delivery port of the cylinder. The exact location of these devices can be in the port body, in the neck cavity, or inside the cylinder itself. In each case, the pressure regulator or valve device is located upstream of the cylinder valve seat with respect to flow of gas from the interior of the cylinder to the delivery port.

U.S. Pat. Nos. 6,089,027 and 6,101,816 are both related to a fluid storage and dispensing system comprising a vessel for holding a desired pressure. The vessel contains a pressure regulator, e.g., a single-stage or multi-stage regulator, associated with a port of the vessel, and set at a predetermined pressure. A dispensing assembly, e.g., including a flow control means such as a valve, is arranged in gas/vapor flow communication with the regulator, whereby the opening of the valve effects dispensing of gas/vapor from the vessel. The fluid in the vessel may be constituted by a liquid that is confined in the vessel at a pressure in excess of its liquefaction pressure at prevailing temperature conditions, e.g., ambient (room) temperature.

U.S. Pat. No. 6,857,447 B2 discloses a gas dispensing assembly wherein the source vessel contains a gas at pressures ranging from 20 to 2,000 psig. The apparatus requires a high pressure gas cylinder with a larger than typical neck opening to accommodate the introduction of two pressure regulators in series along the fluid discharge path. The first regulator on the inlet gas side drops the pressure from 1,000 psig (or the actual pressure within the vessel at the time) to 100 psig, while the second regulator from 100 psig to sub-atmospheric pressure.

U.S. Pat. No. 7,905,247 discloses a fluid storage and dispensing vessel having a dispensing vacuum-actuated valve and a flow restriction arrangement to provide a virtually fail safe system for preventing hazardous discharge of fluid from a pressurized cylinder or tank. The valve element includes a poppet valve 32 and a pin 42 seated against the poppet valve 32, as depicted at FIG. 3. The poppet valve 32 is a conical shaped pin device 42 which fits into a matching conical seating cavity referred to as valve seat 36. An elastomer material is molded onto the poppet valve 32. In the closed condition, spring 34 normally presses poppet valve 32 against a valve seat 36. When the valve 32 opens in response to a predetermined vacuum condition surrounding the chamber of the bellows 38 which is internally sealed at atmospheric pressure or higher, bellows 38 expands in the longitudinal direction to create a downward force that is sufficient to urge the poppet valve 32 downwards, thereby moving the poppet valve 32 away from seat 36, which creates a gap for pressurized gas within the interior of cylinder to flow therethrough. U.S. Pat. Nos. 6,007,609 and 6,045,115 disclose flow restrictors disposed along the fluid flow path and which provide capillary size openings that minimize any discharge of toxic gases from compressed gas cylinders in the unlikely event that the dispensing valve fails.

An alternative vacuum-actuated valve design is an o-ring design as shown in FIG. 2 of U.S. Pat. No. 7,905,247, which discloses an o-ring 88 disposed concentrically around the lower base section of a pin 90 that is held in place by a spring bushing. The pin 43 is adapted to move between a sealing position that blocks fluid flow along a fluid flow path and an open position that permits fluid along the fluid flow path. Specifically, a recessed counterbore or groove is provided within a valve base 84 to accommodate an o-ring 88 which is generally formed from a perfluro-elastomer material that is designed to seal as well as compress and decompress. The o-ring 88 remains in a stationary position within the groove of the valve base 84. When the valve is in the closed position, the o-ring 88 is compressed within the groove. The compression of the o-ring 88 between the valve base 84 and the base 90 of the pin 43 prevents the flow of the gas. In the open position, the bellows chamber 50, which is sealed at atmospheric pressure or higher, expands in response to a predetermined vacuum condition surrounding the bellows chamber 50 to create a downward force that is sufficient to urge the stem portion of the pin 43 downwards, thereby moving the base 90 of the pin 43 away from the o-ring 88, which creates a gap for pressurized gas within the interior of cylinder to flow therethrough.

Despite the related storage and delivery systems, sub-atmospheric flow instability continues to be a significant problem. In particular, delivery pressure oscillations and opening pressure spikes persist with all of the above mentioned vacuum-actuated valve and regulator designs. Ion implant tools tend to be sensitive to such delivery pressure spikes and oscillations, as the flow instability creates flow spikes which can automatically shut down an ion implant tool at a semiconductor fabrication plant, thereby resulting in increased down time for the semiconductor manufacturer. Additionally, there are instances when the pin-poppet valve design problematically does not dispense gas at desired downstream vacuum conditions.

In view of such drawbacks, there remains a need for an improved vacuum-actuated valve assembly capable of flow stability. Other objects and aspects of the present invention will become apparent to one of ordinary skill in the art upon review of the specification, drawings and claims appended hereto.

SUMMARY OF THE INVENTION

The invention relates, in part, to a modified vacuum actuated valve assembly and sealing mechanism for improved flow stability of fluids sub-atmospherically dispensed from storage and delivery systems.

In a first aspect, a vacuum-actuated valve assembly (10), comprising: a modified bellows (13) defined at least in part by an enclosed chamber (18) sealed to isolate said chamber (18) from an outside region (14) surrounding the bellows (13), said bellows (13) comprising side regions (31) configured to longitudinally expand in response to a predetermined vacuum condition surrounding the outside region (14) of the bellows (13), said bellows (13) having a top portion threadably engaged to a port body (21) along an outer diameter of the bellows (13), and said bottom portion of the bellows (13) substantially defined by a contact plate (19); a pin (17) having a top end extending towards the bottom portion of the bellows (13) and a bottom end extending through an opening (28) of a stationary thermoplastic seat (11) and an opening (29) in a top portion (16) of a stabber (12) to contact a surface of the stabber (12); the stationary seat (11) consisting essentially of a thermoplastic material and characterized by the absence of elastomeric material, said stationary seat (11) comprising the opening (28) extending from an outer surface (27) of the seat (11) to an inner sealing surface (26) of the seat (11), said seat (11) further comprising a grooved region (15) extending along said inner sealing surface (26) of said stationary seat (11); the stabber (12) comprising a body portion (30) and the top portion (16) each of which is situated within the interior of the stationary seat (11), said interior of the stationary seat (11) defined, at least in part, by an inner diameter greater than an outer diameter of the top portion (16) and an outer diameter of the body portion (30) thereby creating a passageway (20) between the stabber (12) and the seat (11); wherein said top portion (16) of the stabber (12) is abutted against said grooved region (15) of the stationary seat (11) so as to be maintained in mechanical engagement therealong when the bellows (13) is in a non-expanded state, said engagement creating a seal that blocks the passageway (20) and prevents the flow of fluid therethrough, thereby creating a closed configuration of the valve assembly (10); wherein expansion of the bellows (13) along the side regions (31) in a longitudinal direction in response to the predetermined vacuum condition surrounding the outside region (14) of the bellows (13) increases the length of the side regions (31) of the bellows (13) by an incremental amount sufficient to urge the contact plate (19) downward against the top end of the pin (17), thereby causing said bottom end of the pin (17) to push down against the surface of the stabber (12) and push the top portion (16) of the stabber (12) away from the grooved region (15) along the inner sealing surface (26) of the stationary seat (11), thereby mechanically disengaging the seal to unblock the passageway (20) and create a gap between the top portion (16) of the stabber (12) and the inner sealing surface (26) of the stationary seat (11) to create an open configuration of the valve assembly (10) for the fluid to pass therethrough.

In a second aspect, a sealing structure and mechanism for a valve assembly (10), comprising: a stationary seat (11) consisting essentially of a thermoplastic material and characterized by the absence of elastomeric material; the stationary seat (11) comprising an opening (28) extending from an outer surface (27) of the stationary seat (11) to an inner sealing surface (26) of the stationary seat (11), said seat (11) further comprising a grooved region (15) extending along said inner sealing surface (26) of said stationary seat (11); said grooved region (15) of the seat (11) comprising a coined surface configured to elastically compress within a predetermined elastic-like zone upon engagement with the top portion (29) of the stabber (12); the stabber (12) comprising a body portion (30) and the top portion (16) each of which is situated within the interior of the stationary seat (11), said top portion (16) having a frusto-conical shape; the interior of the stationary seat (11) defined, at least in part, by an inner diameter greater than an outer diameter of the top portion (16) and an outer diameter of the body portion (30) thereby creating a passageway (20) between the stabber (12) and the seat (11); wherein said top portion (16) of the stabber (12) is adapted to move between a closed configuration and an open configuration, said closed configuration defined by said top portion (16) of the stabber (12) abutted against said grooved region (15) of the stationary seat (11) so as to be maintained in mechanical engagement therealong, said engagement creating a seal that blocks the passageway (20), thereby creating a closed configuration of the valve assembly (10); the open configuration defined by the top portion (16) of the stabber (12) spaced away from the grooved region (15) along the inner sealing surface (26) of the stationary seat (11) so as to mechanically disengage the seal to unblock the passageway (20) and create a gap between the top portion (16) of the stabber (12) and the inner sealing surface (26) of the stationary seat (11) to create an open configuration of the valve assembly (10).

In a third aspect, a sealing structure and mechanism for a vacuum-actuated valve assembly (10), comprising: a stationary seat (11) consisting essentially of a thermoplastic material and characterized by the absence of elastomeric material, said seat (11) comprising an opening (28) extending from an outer surface (27) of the stationary seat (11) to an inner sealing surface (26) of the stationary seat (11), said seat (11) further comprising a grooved region (15) extending along said inner sealing surface (26) of said stationary seat (11); and a stabber (12) comprising a body portion (30) and a top portion (16); the stationary seat (11) adapted to receive the stabber (12) having the top portion (16) which is received into the grooved region (15) of the stationary seat (11).

BRIEF DESCRIPTION OF THE DRAWINGS

The advantages of the invention will be better understood from the following detailed description of the preferred embodiments thereof in connection with the accompanying figures wherein like numbers denote same features throughout and wherein:

FIGS. 12a-12d show step-by-step schematics of a possible mechanism contributing to the undesirable shape alteration of the conventional o-ring design vacuum-actuated valve of FIG. 2 [consider showing spatial relation of bellows in each of 12a-12d;

FIG. 14b shows a perspective view of the stabber of FIG. 14a.

DETAILED DESCRIPTION OF THE INVENTION

Figure 1A:
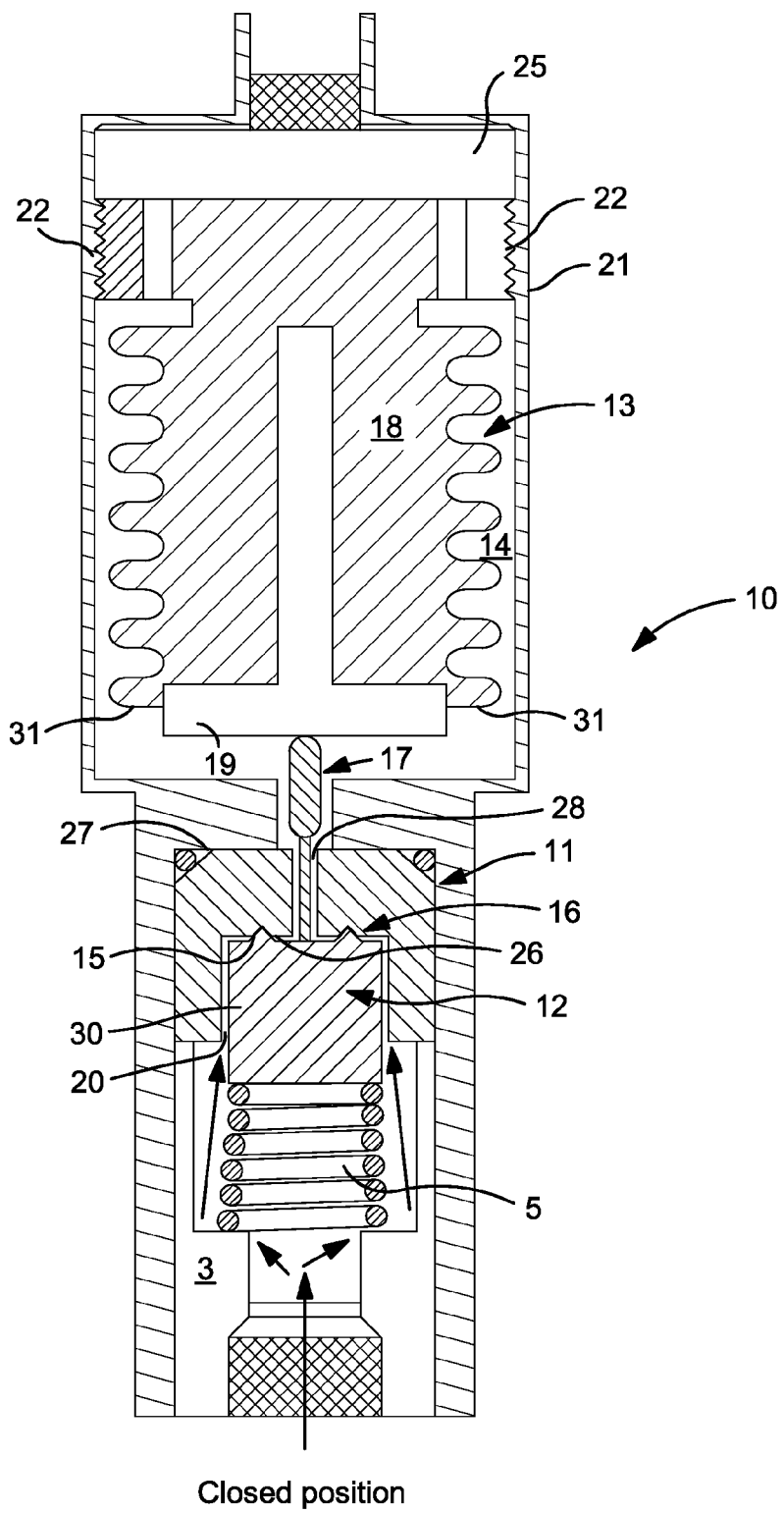
FIG. 1a is a schematic of the vacuum-actuated valve in accordance with the principles of the present invention in which the valve is a closed configuration.

The relationship and functioning of the various elements of this invention are better understood by the following detailed description. The detailed description contemplates the features, aspects and embodiments in various permutations and combinations, as being within the scope of the disclosure. The disclosure may therefore be specified as comprising, consisting or consisting essentially of, any of such combinations and permutations of these specific features, aspects, and embodiments, or a selected one or ones thereof.

It should also be understood that the drawings are not to scale, and in certain instances, details in the drawings have been omitted which are not necessary for an understanding of the embodiments, such as conventional details of fabrication and assembly. The drawings provided herein are intended to illustrate the principles by which the present invention can be carried out.

The term "fluid" as herein is intended to mean a gas, liquid, vapor or any combination thereof. As used herein, unless indicated otherwise, all concentrations are expressed as volumetric percentages ("vol %") based on the total volume of the fluid.

The present invention has recognized that conventional vacuum actuated valve assemblies typically have been unable to deliver stable sub-atmospheric flows of pressurized gas from the interior of a cylinder as a result of possessing unreliable sealing mechanisms. The unstable flow behavior created from such sealing mechanisms typically involves delivery pressure spikes and oscillations, and even in some instances, the absence of dispensed fluid arising from failure of the valve to actuate from a closed configuration to an open configuration. Such delivery pressure instabilities and failures creates unstable flow behavior that cannot be tolerated by various downstream processes, including ion implant tools which contain auto abort systems designed to shut down when encountering flow rate deviation from a target set point.

Accordingly, the present invention is directed to a modified valve assembly characterized by a novel sealing structure and mechanism for ensuring stable flow behavior. The Examples, as will be described below, demonstrate the significantly improved flow stability achieved with the inventive vacuum actuated valve assembly.

Figure 1B:
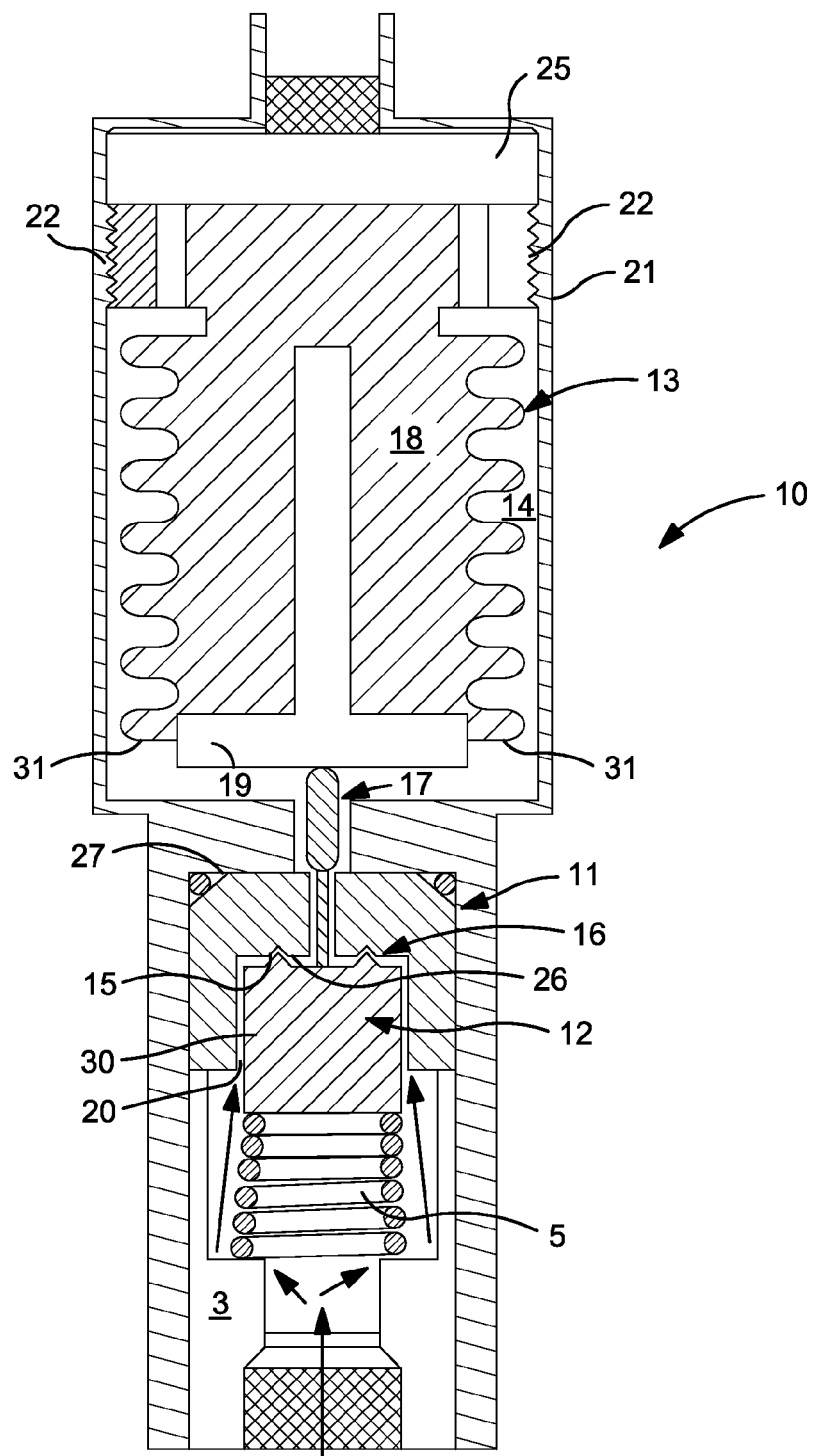
FIG. 1b is a schematic of the vacuum-actuated valve in accordance with the principles of the present invention in which the valve is in an open configuration.
Figure 1C:
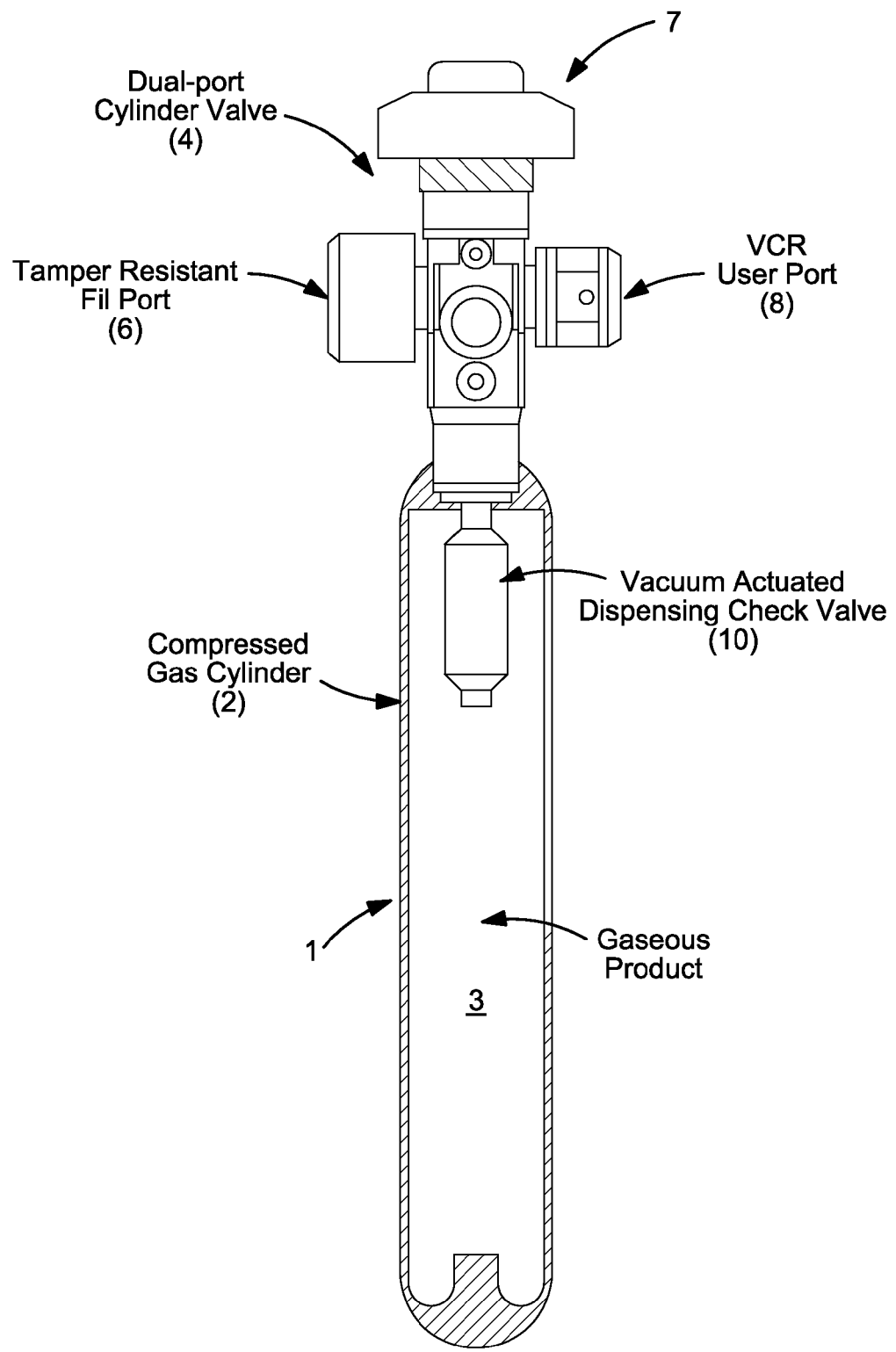
FIG. 1c is a schematic of the vacuum-actuated valve disposed within a cylinder which stores pressurized gas.

An exemplary vacuum-actuated valve assembly 10 in accordance with principles of the present invention is shown in FIGS. 1A and 1B. FIGS. 1A and 1B show the structural elements of the valve assembly 10 in a closed and open configuration, respectively. It should be understood that the structural features of the valve assembly 10 are not drawn to scale, and some features are intentionally omitted for purposes of clarity for purposes of illustrating the principles of the present invention. The Figures are depicted in a manner to illustrate the sealing mechanism and how such sealing mechanism creates superior flow stability in comparison to conventional vacuum-actuated devices. Preferably, the valve assembly 10 is disposed entirely within the interior region of a cylinder 2 as shown in FIG. 1C. Alternatively, the valve assembly 10 may be disposed within other types of vessel packages besides cylinders.

FIG. 1C shows a system 1 for the storage and sub-atmospheric delivery of pressurized fluid. The system 1 includes a cylinder 2 containing the pressurized fluid 3, preferably in a gaseous or partially gaseous phase. A dual port cylinder valve head 4 is shown threadably engaged at the top end of the cylinder 2. The dual port cylinder valve head 4 can be a dual port valve, which is commercially available by Rotarex, Inc. The valve head 4 has a fill port 6, through which cylinder 2 is filled with fluid. Upon filling, fluid 3 can be withdrawn through user port 8. Generally speaking, fluid 3 that is stored under pressure within the interior of cylinder 2 will flow into the inlet of vacuum-actuated valve assembly 10 via flow discharge path in response to a predetermined vacuum condition located downstream of the system 1, as indicated by the upward arrows in FIG. 1C. Handle 7 allows control of the fluid along the fluid path through user port 8. This type of fluid storage and dispensing system is described in U.S. Pat. Nos. 5,937,895 and 6,007,609 and 6,045,115, albeit referencing a single port valve cylinder head, and which are incorporated herein by reference in their entirety.

In one example, the system 1 is connected to an ion implant tool (not shown). A flow conduit extends from the outlet of user port 8 to the inlet of the ion implant tool. A pressure transducer and mass flow controller are preferably situated along the conduit for measuring and data logging delivery pressure (torr) and flow rate (sccm).

Figure 2:
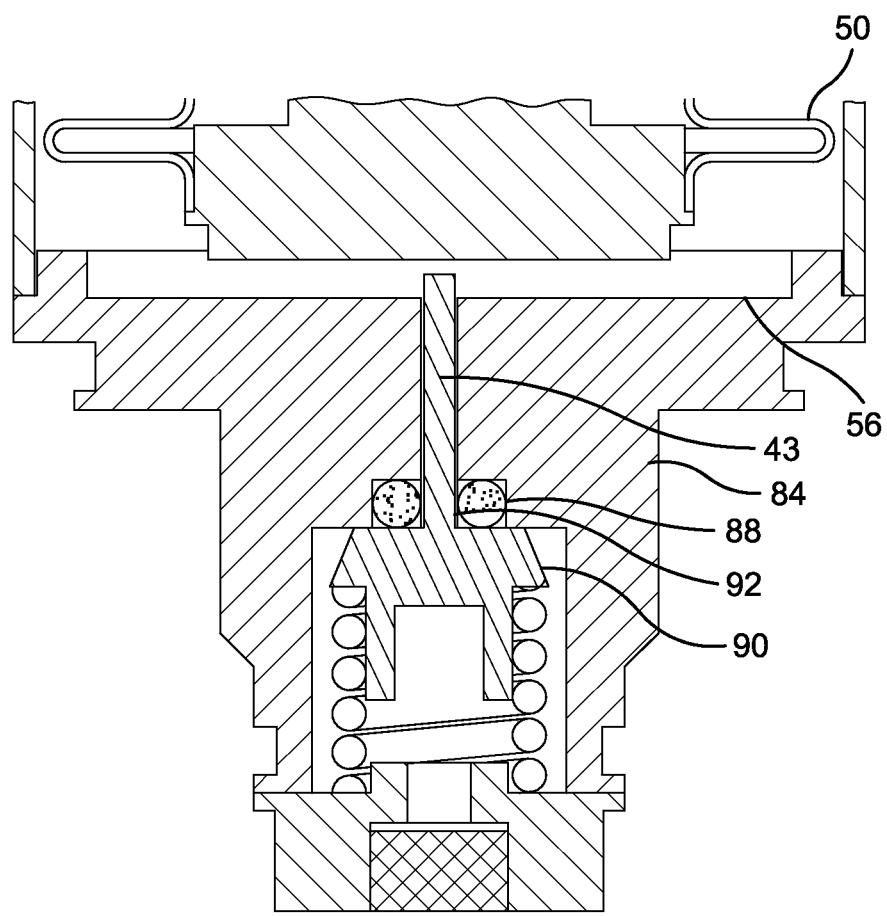
FIG. 2 is a cross-sectional schematic of a conventional o-ring design vacuum-actuated valve.
Figure 3:
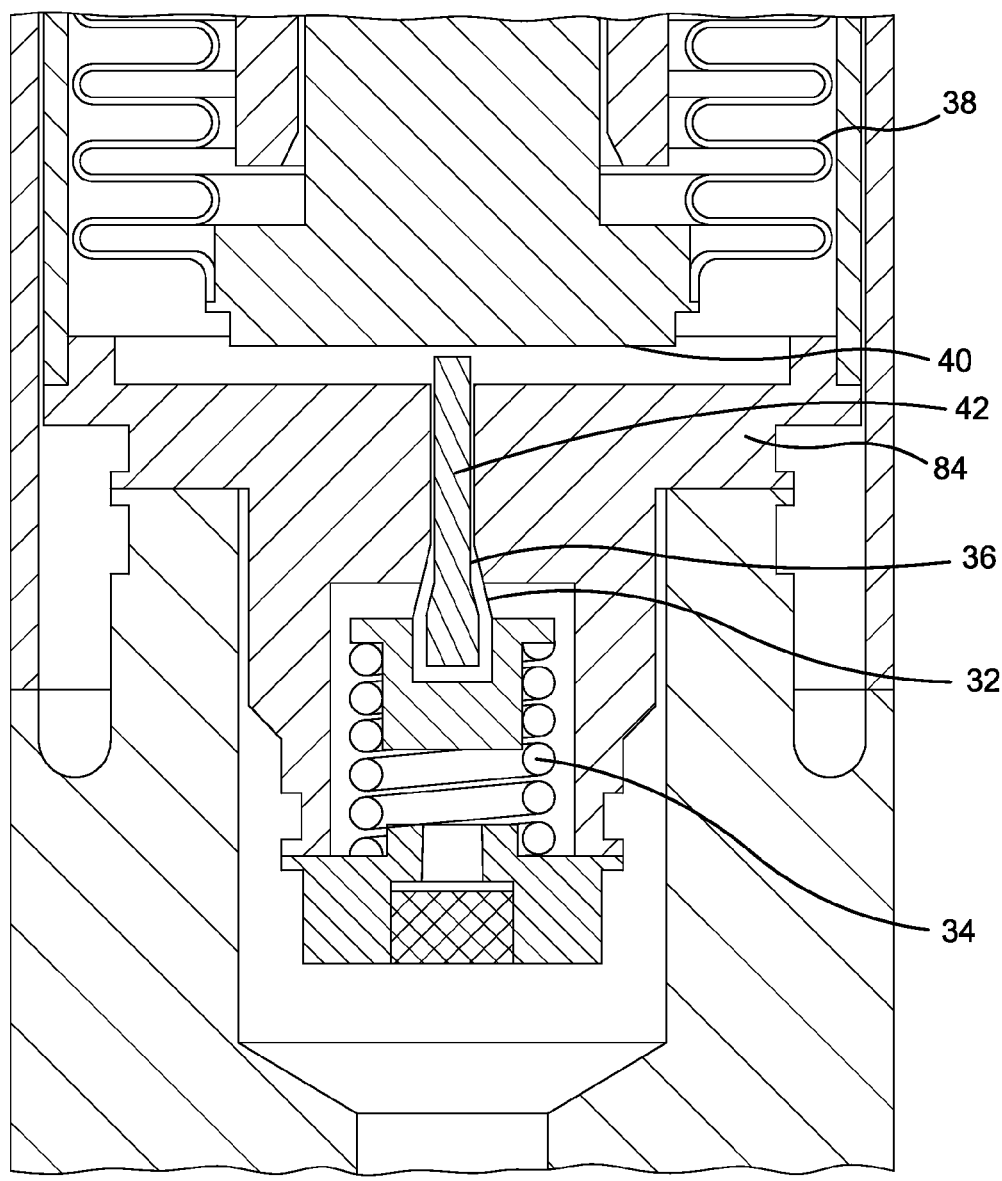
FIG. 3 is a cross-sectional schematic of a conventional pin and poppet vacuum-actuated valve.

The flow discharge path is created when the valve assembly 10 actuates from the closed to open configuration, as will be clear from FIGS. 1A and 1B which will now be discussed in greater detail. The ability of the assembly 10 to actuate at the desired vacuum pressure on a repeated basis, even when exposed to toxic and hazardous fluids for a prolonged period of time, is attributed to the novel sealing assembly. The sealing assembly can be characterized by a customized stationary seat 11 and a movable stabber structure 12. The term "stationary" or "non-moving" as used herein is intended to refer to the substantial absence of permanent movement (upwards or downwards) of the seat 11 during its service lifetime. As will be explained, the seat 11 is designed to undergo controlled elasticity during closing and opening of the valve assembly 10. The seat 11 is formed from a suitable hardened thermoplastic material. The selected thermoplastic seat 11 by virtue of its rigidity is not subject to undesirable shape alterations so as to adversely affect flow stability, and as a result, tends to remain substantially unaltered in shape during one or more cycles of transitioning between the open configuration and the closed configuration of the valve assembly 10. In contrast, the elastomeric o-ring valve design (FIG. 2) is subject to substantial undesirable shape alteration, which will be explained in greater detail below, so as to result in shape alterations of the o-ring which adversely affects flow stability during cycling between the open and close configurations. Additionally, the stationary thermoplastic seat 11 does not create a so-called "wedging effect" (as will be explained below with reference to the pin-poppet design) of the stabber 12 into the seat 11. In a preferred embodiment, the stationary seat 11 is formed from a thermoplastic fluoropolymer referred to as polychlorotrifluoroethylene (PCTFE), which is commercially available from Daikin Industries Ltd. and sold as Neoflon™ material. The material by virtue of its specific chlorortifluoroethylene polymeric structure has higher compressive strength and lower deformation under load in comparison to the elastomeric materials utilized for the o-ring design (FIG. 2) and the molded pin-poppet design (FIG. 3). Other suitable thermoplastic materials may be utilized which are not subject to a undesirable shape change. Such materials can include but are not limited to polytetrafluoroethylene, PFA (a copolymer of tetrafluoroethylene and perfluoroalkyl vinylether), FEP (a perfluoro co-polymer of tetrafluoroethylene and hexafluoropropylene), ETFE (a copolymer of tetrafluoroethylene and ethylene), polyvinyl chloride, polystyrene and polyamide. However, in accordance with principles of the present invention, the seat 11 is not formed from elastomeric materials which tend to deform upon compressive loading and undergo undesirable shape alteration which disrupts the seal and creates flow instabilities during dispensing of the gas. The hardened thermoplastic allows the stationary seat 11 to retain its structural integrity upon compressive loading when the seal is formed with the stabber 12 (FIG. 1A). As a result, the stationary seat 11 does not undergo undesirable shape alteration during storage and delivery of the gas. No swelling of the thermoplastic seat 11 occurs.

Prior the present invention, the sealing assemblies of the o-ring and pin-poppet valves were formed from elastomeric materials, as elastomeric materials had the ability to deform and undergo compressive loading. In this regard, the present invention is counterintuitive and discovered, on the contrary, that a rigid thermoplastic not subject to high deformation and compressive loading could assist in formation of a superior sealing mechanism relative to an elastomeric seal, when the valve assembly 10 is subject to the incorporation of other design considerations that will be described with regards to the seat 11 and stabber 12. The seat 11 remains stationary during formation of the seal (FIG. 1A) and breaking of the seal (FIG. 1B) as a result of a spring 5 pressing against the seat 11. The seat 11 remains stationary because it is confined between the spring 5 and surrounding housing (not shown) of the valve body and therefore is unable to move.

Accordingly, in addition to the stationary thermoplastic seat 11 that is formed from a specific thermoplastic material, a stabber 12 as shown in FIGS. 1A and 1B is required. The stabber 12 is a structure, preferably made from metallic materials or other hardened materials, that engages with the seat 11 to create a seal (closed configuration of FIG. 1A), and disengages with the seat 11 to break the seal (open configuration FIG. 1B) and create a flow discharge for the gas 3 contained within the cylinder 2 to flow therethrough. The open and closed configuration are dependent upon the predetermined vacuum pressure in the external region 14 surrounding the bellows 13, as will be explained when describing the mechanism by which the seal is formed and broken. The stabber 12 has an opening 29 (more clearly seen in FIGS. 14a and 14b) through which pin 17 extends and contacts the top surface of the stabber 12. The stabber 12 may be formed from suitable metallic-based materials, such as stainless steel, nickel-based alloys, or other materials which are compatible with the gases being delivered. Other types of hard materials with similar type of hardness may also be utilized such as, by way of example, ruby or sapphire. Spring 5 extends around at least a portion of the stabber 12 and biases the stabber 12 upwards against the seat 11 in the absence of a sufficient downward force produced by an expanded bellows 13.

Figure 14A:
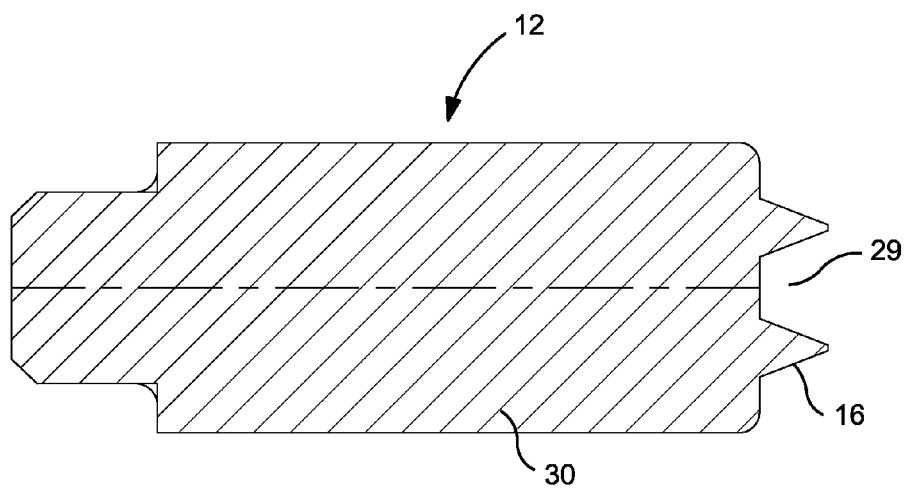
FIG. 14a shows a cross-sectional view of the stabber in accordance with the principles of the present invention.
Figure 14B:
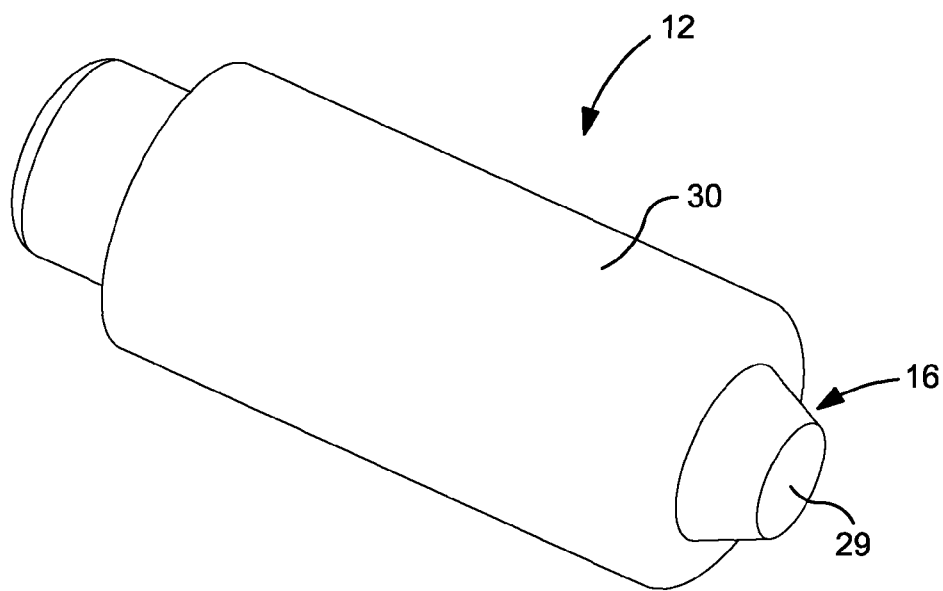

The top portion 16 is defined by a circular-like structure that has an opening 29, as more clearly seen in FIGS. 14a and 14b. The opening 29 is sized to receive the bottom portion of pin 17 during engagement (FIG. 1a) and disengagement (FIG. 1b) of the top portion 16 with grooved regions 15 of seat 11. The top portion 16 of the stabber 12 is configured to engage within a complimentary inner sealing face 26 of stationary seat 11 extending along the indentations or groove regions 15 of the thermoplastic stationary seat 11, thereby creating a seal within the grooved region 15 of the stationary seat 11, as shown in FIG. 1A.

Referring to the cross-sectional view of FIG. 14a and the perspective view of FIG. 14b, the top portion 16 of the stabber 12 extends away from the body portion 30 and terminates as a circular ring-like or rim-like structure that encompasses a substantially 360 degree contact with the seat 11 along the grooved regions 15 therewithin. The circular ring-like top portion 16 is designed to minimize contact surface area with the grooved regions 15 of the seat 11 in comparison to the o-ring design (FIG. 2). In this regard, the top portion 16 has a circular-ring or rim-like structure having a significantly reduced radius or effective width that creates a resultant contact surface area which is preferably at least 10 times less than the contact surface area created with the o-ring valve assembly (FIG. 2) when the o-ring 88 engages with the pin 42. In another embodiment, the top portion 16 creates a resultant contact surface area which is up to about 50 times less than the contact surface area created with the o-ring valve, and more preferably up to 75 times less. By way of example, the circular-ring like structure of the top portion 16 may have a radius that ranges from about 0.0005 inches to about 0.0010 inches.

Preferably, the top portion 16 is narrower than the body portion 16 and the stabber 12 is a unitary piece that is machined to the final dimensions. Both design attributes create a structure capable of withstanding a relatively high amount of compressive stress without undergoing significant deformation. It should be understood that other geometries of the stabber 12 can be utilized in combination with suitable materials of construction (e.g., metallic alloys) and that the stabber 12 can be fabricated as individual components.

The resultant seal of the present invention is created by mechanical engagement of the top portion 16 with corresponding grooved regions 15 (FIG. 1a). The seal is in contradistinction to the surface contact seals formed by o-ring (FIG. 2) and pin-poppet (FIG. 3). Prior to the present invention, increasing contact surface area was regarded as providing effective seals to shut off the flow of gas 3 from the interior of the cylinder 2. However, the reduction in the contact surface area of the seal by the present invention has been unexpectedly discovered to reduce so-called "stiction" between the seat 11 and top portion 16 of the stabber 12 in comparison to the o-ring and pin-poppet designs. The term "stiction" as used herein is defined as the tendency for one object to adhere to another. The reduced stiction of the present invention between the stabber 12 and the seat 11 eliminates the so-called "wedging effect" observed by the pin-poppet design.

Additionally, the reduction in contact surface area advantageously produces a higher stress, as a result of a smaller contact area over which the top portion 16 of the stabber 12 exert its upward oriented force into the indentations 15 of the seat 11. The higher stress creates an improved seal with the indentations 15 of the seat 11 that is less susceptible to the delivery pressure spikes and flow instabilities of conventional vacuum-actuated devices, as will be demonstrated in the Examples.

The resultant seal shuts off the flow discharge path by which gas 3 from the cylinder 2 can travel around the bellows 13 as shown by the arrows in FIG. 1B. In the closed valve assembly 10 configuration of FIG. 1a, gas 3 remains trapped and cannot flow beyond the seal. The strength of the seal produced by the valve assembly 10 can be appreciated by reference to FIG. 1A, in which stored fluid 3 occupies a region that extends upwards (as indicated by the arrows) from the bottom of the cylinder 2; along annular region 20 (i.e., passageway) between the outer surface of the stabber 12 and the inner surface of the seat 11; and thereafter terminates at the seal. The pressurized side of the seal is at cylinder pressure (e.g., 1200 psig) while the low pressure side of the seal is at vacuum (e.g., 200-600 torr). The novel features of the seat 11 and stabber 12 allow formation of a seal having reducing contact area that is capable of such an abrupt transition in pressure on either side thereof.

The combination of a thermoplastic seat 11 not subject to undesirable shape alterations during engagement and disengagement of the seal dramatically improves flow stability and actuation behavior so as to reduce the flow spiking/oscillations that are typically encountered in conventional vacuum-actuated valve assemblies. This design shift is counterintuitive and produces unexpectedly superior behavior as will be shown in the Examples.

FIG. 1A is a cross-sectional schematic that shows a seal that is formed between the stabber 12 and the seat 11. The seal is created when stabber 12 engages to exert an upward force against the indentations 15 of the thermoplastic seat 11. The thermoplastic seat 11 remains stationary or non-movable during formation of the seal. Spring 5 biases stabber 12 so as to push the stabber 12 upwards against the grooved regions of seat 11, thereby causing the stabber 12 to maintain formation of the seal and thereby shut off gas flow therethrough. The resultant seal is maintained along the grooved region 15 of the of the sealing inner surface 26 of seat 11 until a sufficient force is created upon longitudinal expansion of the bellows 13, as will be explained below.

The valve assembly 10 is preferably disposed within cylinder 2 as shown in FIG. 1C. The outlet of the user port 8 of cylinder 2 is connected to an end-user device. In one example, the end-user device is an ion implant tool. A flow conduit extends from the outlet of the user port 8 to the inlet of the ion implant tool. The ion implant tool has a predetermined vacuum level (e.g., 200-400 torr) at which the ion implant process utilizes fluid (e.g., dopant gas 3) that is stored and dispensed from cylinder 2. It should be understood any type of fluid 3 may be stored and delivered utilizing valve assembly 10 for any type of process. A vacuum pump is utilized to reduce the pressure in both the tool, as well as reduce the pressure in the region 14 surrounding and external to the bellows chamber 13. The chamber 18 of bellows 13 is preferably sealed at atmospheric pressure and is an expandable accordion-like chamber as described in U.S. Pat. Nos. 7,708,028; 7,905,247; 5,937,895; 6,007,609; 6,045,115; and 6,959,724, each of which is incorporated by reference in their entirety. A continuous flow path exists from the external region 14 surrounding the bellows 13 to the tool via the conduit extending therebetween. Consequently, a direct path exists for vacuum can be pulled in the tool, through conduit and the region 14 surrounding the bellows 13.

The mechanism for breaking the seal and transitioning from the closed valve assembly 10 configuration of FIG. 1A to the open valve assembly 10 configuration of FIG. 1B will now be explained. When the pressure in region 14 falls within an acceptable vacuum level range, the bellows 13 expands along its side regions 31 in the longitudinal direction as shown in FIG. 1B by virtue of a pressure differential between the enclosed chamber 18 of bellows 13 (which is preferably sealed at atmospheric pressure) and the region 14 surrounding the bellows 13 (which may range, by way of example, between 200-400 torr). The expansion of the bellows 13, as shown in FIG. 1B, creates a downward force that displaces a contact plate 19. The contact plate 19 pushes downwards against a top portion of pin 17, which extends between the bottom of contact plate 19 and the top surface of the stabber 12. The transmitted force causes the pin 17 to push downwards against the top surface of the stabber 12, thereby pushing the top portion 16 of stabber 12 away from the thermoplastic seat 11, which remains stationary. The downward movement of the top portion 16 disengages the top portion 16 of the stabber 12 from the seat 11. The newly created gap mechanically disengages or breaks the seal between the seat 11 and the top portion of stabber 12, as shown in FIG. 1B. With the seal broken, a gap exists for fluid 3 (e.g., gas) to flow therethrough. This allows gas 3 to flow through the newly created gap as indicated by the arrows of FIG. 1B. The gas 3 is now able to flow past the stabber 12; and thereafter along a flow discharge path extending upwards along the pin passage and around pin 17; along the outer region 14 of the bellows 13; and thereafter exit the top of valve assembly 10 and exit though user port 18 (FIG. 1C). As such, the arrows of FIG. 1B are representative of a flow discharge path for gas 3 to be dispensed from the interior of the cylinder 2. By way of example, the gap created can range from 0.002" to 0.030", preferably 0.001" to 0.020" and more preferably 0.0005" to 0.010".

The mechanism for re-establishing the seal and transitioning from the open valve assembly 10 configuration of FIG. 1B to the closed valve assembly 10 configuration of FIG. 1A will now be explained. When the pressure in region 14 increases, the bellows 13 reverts to its non-expanded state by contracting along its side regions 31, as shown in FIG. 1A, by virtue of minimal or substantially zero pressure differential between the enclosed chamber 18 of bellows 13 (which is preferably sealed at atmospheric pressure) and the bellow surrounding region 14 (which may approach the pressure within the bellow chamber 18, such as, by way of example, atmospheric pressure). The lack of a sufficient pressure differential causes the bellows 13 to revert to its non-expanded state, as shown in FIG. 1A. As bellows 13 reverts to its non-expanded state, spring 5 causes stabber 12 to move upwards and presses pin 17 upwards. As the spring 5 pushes the stabber 12 upwards the top portion 16 of stabber 12 is urged into the grooved regions 15 of the thermoplastic seat 11, which remains stationary. This engagement of the top portion 16 of stabber 12 with the corresponding grooved region 15 of the thermoplastic seat 12 re-establishes the seal, as shown in FIG. 1A. No gap exists for gas 3 to flow therethrough. The gas 3 remains stored within the interior of cylinder 2.

Figure 10A:
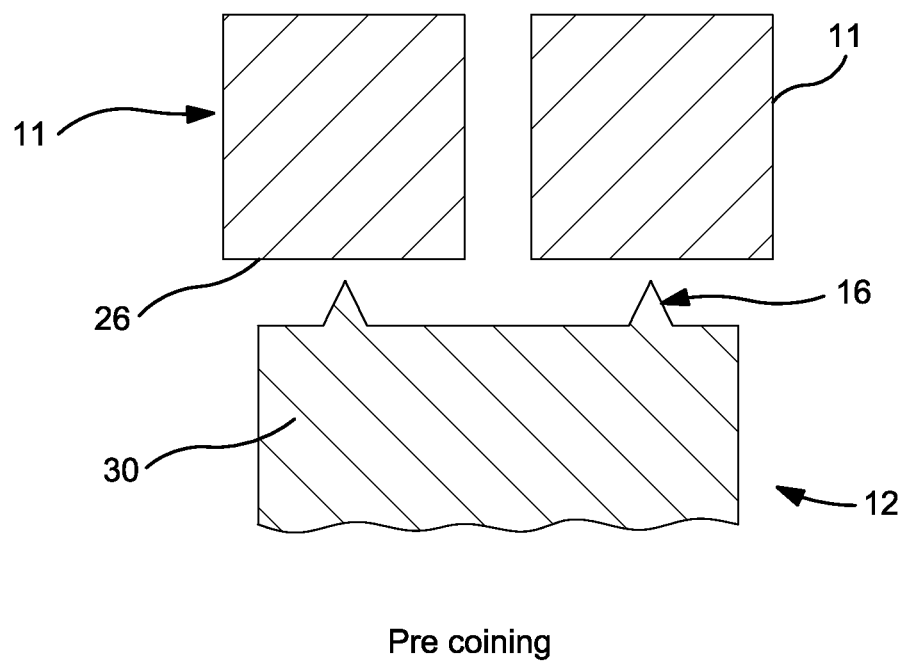
FIGS. 10a-10c show the coining process that is imparted to the seat so as to allow the components to work within a specific zone of elasticity.
Figure 10B:
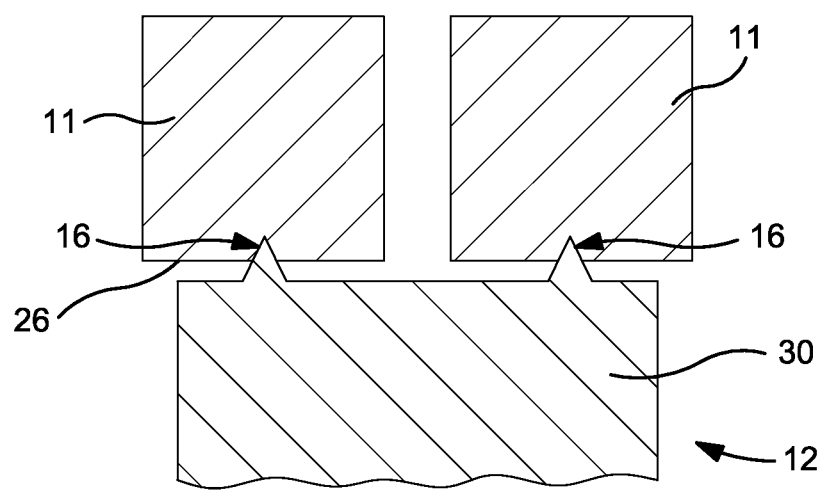
Figure 10C:
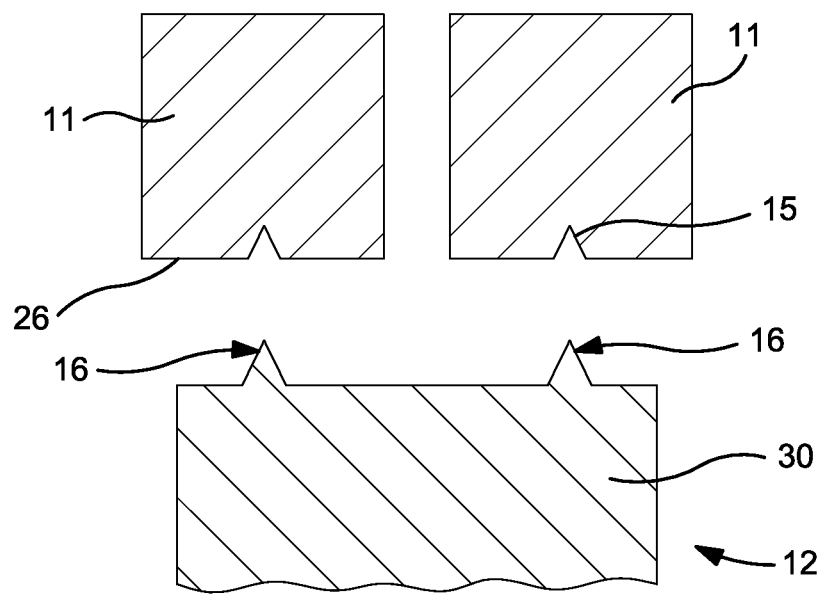

Another unique aspect of the sealing mechanism of the present invention can be attributed to coining. "Coining" refers to a process of creating a complimentary grooved region or indentation in the sealing face of seat 11 at a temperature and pressure greater than the indentations will be exposed to during service life. Specifically, the coining is performed at temperatures and pressure conditions above the yield condition of the particular thermoplastic seat 11 (e.g., Neoflon™ seat). Under such conditions, the smooth surface of the top portion 16 of the stabber 12 presses against any surface irregularities of the thermoplastic seat 11 along its face so as to produce a relatively smooth coined mating inner sealing surface 26 for the circular top portion 16 of the stabber 12. FIG. 10c shows the resultant sealing face after completion of the coining, whereby indentations 15 are formed within the thermoplastic seat 11. Structural details have been intentionally omitted for purposes of clarity. Besides removing any surface roughness, the top portion 16 of the stabber 12 also creates a pressed geometry on the inner sealing face 26 of the thermoplastic seat 11 which is conformal with the shape of the top portion 16. The process is illustrated in FIGS. 10A-10C. Both of these features (absence of surface roughness and pressed geometry) of the seat 11 achieve the superior seal upon engagement of the top portion 16 of stabber 12 with the thermoplastic seat 11 during operation of the valve assembly 10. In addition, the coined surface allows for the smooth or stable actuation behavior of the valve assembly 10 as demonstrated in the Examples 1-3. In one example, the conditions for coining are performed as follows: The seat 15 and stabber top portion 16 are assembled into the closed configuration, and the unit is heated to a temperature that can range from 110-160 degrees Fahrenheit while a pressure ranging from 2000-3000 psig is applied to the upstream (stabber) side of the valve device (stabber 12 and seat 11). The assembly is held at these conditions for approximately 1 hour, and then the pressure is released, and the valve device is allowed to cool to room temperature.

Figure 11A:
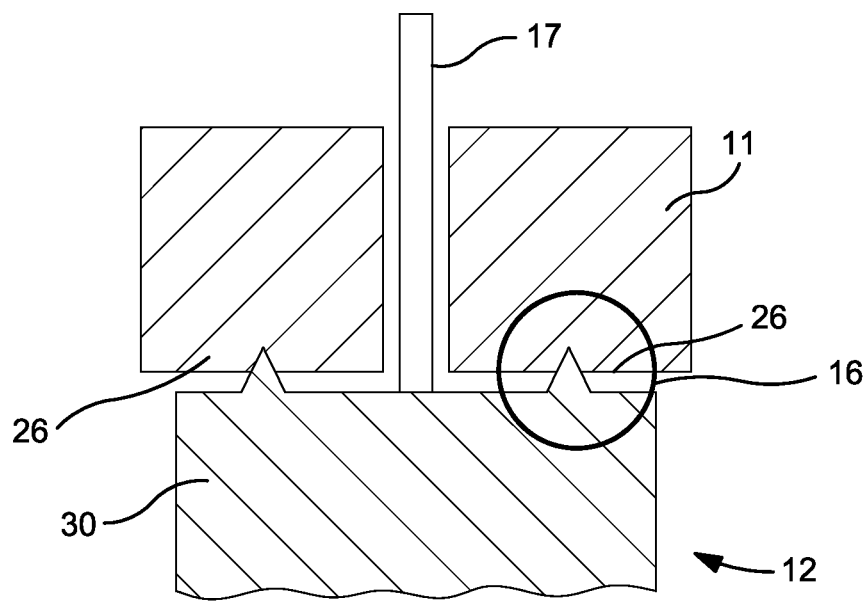
FIGS. 11a-11d show sealing and flow phenomena as a result of the coining process, whereby the thermoplastic seat operates within an elastic-like zone imparted by the coining process described in FIGS. 10a-10c.
Figure 11B:
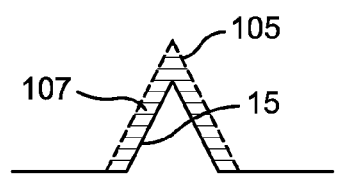
Figure 11C:
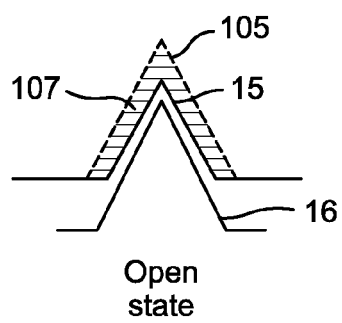
Figure 11D:
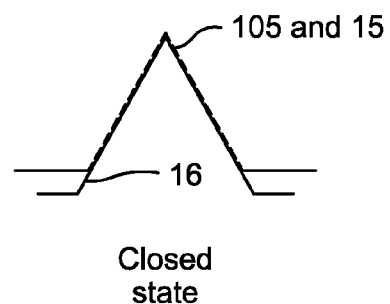

The resultant sealing face or surface 26 extending along the grooved/indented regions 15 after coining is shown in FIGS. 11a-d. FIGS. 11a-11d are intended to show the sealing and flow phenomena as a result of the coining process, whereby the thermoplastic seat 11 operates within a zone-like elasticity imparted by the coining process described in FIGS. 10a-10c. FIGS. 11b-d are blown-up views of the encircled region of FIG. 11a. The solid dark lines (in FIGS. 11b-11d) are intended to illustrate the substantially smooth sealing face 26 within the grooved or indented regions 15 of seat 11. During normal operating conditions of the valve assembly 10, there exists an elastic-like zone 107 within which the coined thermoplastic seat 11 operates. FIG. 11b shows the elastic-like zone 107 with the top portion 16 of stabber 12 omitted for purposes of clarity. Within this elastic-like zone 107, the thermoplastic seat 11 compresses (without undergoing undesirable shape alteration as will be described in connection with FIGS. 12a-d).

FIG. 11d shows the circular periphery of the top portion 16 of stabber 12 engaged upwards and along the grooves or indentations 15 of the coined thermoplastic seat 11. The compression occurs in this elastic-like zone 107 to allow formation of the seal when pressure is applied upstream of the stabber 12 (i.e., the closed position of FIG. 11d in which the bellows 13 is not in an expanded configuration that is sufficient to push pin 17 and stabber 12). The depth to which the seat 11 compresses and moves upwards relative to the open state (FIG. 11c) is shown in FIG. 11d within this elastic-like zone 107 by the dashed line 105. When the stabber 12 is pressed in a downwards direction under the expansion of the bellows 13, as explained when transitioning from FIGS. 11d to 11c, the thermoplastic seat 11 decompresses, without undesirable shape alteration, as a result of the bellows 13 urging the stabber 12 down and away from the seat 11. FIG. 11c shows that the top portion 16 of stabber 12 (indicated in solid lines) moves away from the grooved regions 15 a controlled amount, and the seat 11 decompresses and moves downwards relative to the close state (FIG. 11d). As a result, a flow discharge path is created between the indented surface 15 of seat 11 and top portion 16 of stabber 12 for the gas stream to flow through. This is the open state as shown in FIG. 11C. When the bellows 13 retracts (i.e., reverts to its non-expanded state as the pressure surrounding the region 14 of bellows 13 increases above the sealing pressure of the chamber 18 of bellows 13), the stabber 12 moves upwards and again elastically compresses the seat 11 (without undergoing undesirable shape alteration) upwards to create a seal along the indented regions 15 of the thermoplastic seat 11 (FIG. 11d). It is contemplated that this elastic-like zone 107 thickness may range from 1 micron to 100 microns depending on the operating condition. The presence of this elastic-like zone 107 created as a result of coining provides reproducibility and reliability in the operation of the valve assembly 10, as demonstrated in Examples 1-4.

The novel structure of the valve assembly 10 overcomes the delivery pressure spikes and oscillations experienced with the conventional o-ring design vacuum-actuated valve. Specifically, the present invention has discovered that the o-ring valve design as shown in FIG. 2 undergoes shape alteration of the o-ring during service life. The shape alteration was determined by Applicants to cause the flow instabilities as observed, described and graphically illustrated in Comparative Examples 1-4. FIG. 2 is a cross-sectional schematic of a conventional o-ring design vacuum-actuated valve. The o-ring 88 serves as an elastomeric seal when the pin 42 engages with the o-ring 88. The o-ring 88 remains in a stationary position within the groove of the valve base 84. When the o-ring valve is in the closed position, the o-ring 88 is compressed by pin 42 within the groove of the valve base 84. Applicants have discovered that the o-ring 88 has a tendency to become susceptible to significant deformation and shape alteration upon exertion by various forces, including compressive loading by the force exerted by the pin 42 and pressure of the gas within the cylinder. The deformation and shape alteration can occur to a degree where the o-ring 88 can affect seal integrity, thereby creating flow instabilities upon actuation of the o-ring valve.

FIGS. 12a-12d show schematics of a possible mechanism contributing to the undesirable shape alteration of the o-ring 88 for the conventional vacuum-actuated valve assembly of FIG. 2. FIG. 12a shows the valve in a closed or sealed configuration. The seal created by o-ring 88 and the pin 42 in FIG. 12a is not broken. As a result, no flow discharge path exists between the o-ring 88 and any of the surfaces of the pin 42 and valve base 84. The o-ring 88 is in a shape that is deformed as a result of Fg, which is the force exerted on one portion of the o-ring 88 by the pressurized gas that is stored in the cylinder. The force Fg is indicated by the arrows in FIG. 12a.

Without being bound by any particular theory, it is believed that various other forces exerted onto the o-ring 88 (as shown in FIGS. 12b and 12c) alter its shape to further deform or alter the shape of the o-ring 88 to create an elongated shape as shown in FIGS. 12b and 12c. $F_{Ad}$ is the adhesion force which prevents the o-ring 88 from being released from the surface of the pin 42 and valve base 84; $F_{Fr}$ is the frictional force along the valve base 84 surface which prevents the o-ring 88 from sliding therealong; and $F_S$ is the force exerted by the o-ring 88 in its attempt to revert to its natural round shape. The phenomena shown in FIGS. 12b and 12c may be occurring simultaneously to create the elongated o-ring 88 configuration. This elongated configuration of the o-ring 88 occupies more space within the groove of the valve base 84 and therefore pushes the pin 42 further down and away from the bellows. This further downward movement of the pin 42 relative to FIG. 12A is indicated by the increased spacing L2 between the valve base 84 (which remains stationary) and the pin 42, as shown in FIGS. 12b and 12c. The movement of the pin 42 downwards relative to FIG. 12a is indicated by the spacing L2 being greater than the spacing L1 of FIG. 12a. The result is that the bellows 50 is spaced apart from the top of the pin 42 (FIG. 2). As a result, greater vacuum must be created for additional expansion of the bellows 50 to occur to enable the bellows 50 to engage and push down the top of pin 42 and break the seal configuration of FIGS. 12b and 12c. As the o-ring 88 elongates, it will reach a point where the frictional and adhesive forces, $F_{fr}$ and $F_{ad}$, respectively, are overcome. The seal breaks at the lower vacuum pressure, and the o-ring 88 is released from the surface of the pin 42 and valve base 84, allowing the valve to actuate from the closed to open configuration. As the o-ring 88 regains its natural round shape, the pin 88 moves upwards to create the configuration shown in FIG. 12d, where L3 is less than L2. The o-ring 88 in FIG. 12d has reverted to its natural shape within the grooved region of the valve base 84, thereby causing the pressure in the surrounding region 14 external to the bellows 13 to instantaneously increase, which creates an opening delivery pressure spike, as observed and graphically illustrated in the Comparative Examples. When the opening delivery pressure spike occurs, flow occurs between the o-ring 88 and pin surface 88 (FIG. 12d) as indicated the arrow. The pressure upstream of a mass flow controller, situated downstream of the o-ring valve, also increases in pressure, as indicated by a flow spike in the Comparative Examples. The result is an overshoot in the flow rate as the mass flow controller cannot instantaneously compensate for the change in pressure. This flow spike is disruptive to many processes, including an ion implanter, in which the deviation in the flow causes the ion implanter to shut down and proceed into an alarm mode.

The deformation and alteration in shape of the o-ring 88 has been discovered by Applicants to be further influenced by the specific type of gas stored and dispensed as well as the pressure at which the gas is stored. Certain toxic gases, such as BF3, can cause the elastomeric o-ring to swell, particularly when the o-ring seal is exposed to the stored BF3 for a prolonged period of time (e.g., 24 hours or more). The swelling may further change dimensions of the o-ring 88. The o-ring 88 may undergo greater elongation, which can result in increased delivery pressure spikes and/or greater flow excursions.

The present invention eliminates the delivery pressure spikes and flow spikes incurred with an o-ring design by virtue of a valve assembly 10 that is not prone to undesirable shape alteration, deformation and swelling. The result is superior actuation behavior of the valve capable of producing stable delivery pressure and flow behavior.

The novel structure of the valve assembly 10 also overcomes the so-called "no-flow" failure mode of the pin-poppet valve. FIG. 3 is a cross-sectional schematic of a conventional pin and poppet vacuum-actuated valve FIG. 3 shows a poppet valve 32 as a conical shaped pin device which fits into a matching conical seating cavity referred to as valve seat 36. An elastomer material is molded onto the poppet valve 32. In the closed condition, spring 34 normally presses poppet valve 32 against a valve seat 36. However, the molded elastomer of the poppet valve 32 has a tendency to wedge so tight within seat 36 that the expansion of the bellows is unable to create enough thrust force to urge down the poppet valve 32. The pin-poppet does not actuate at any of the vacuum conditions, thereby creating no flow. Such a failure mode referred to as the "wedge-effect" was observed as described at Comparative Example 5.

The present invention utilizes a stabber 12 and stationary seat 11 to overcome the "wedge effect" problems of the pin-poppet design. The inventive valve assembly 10 is coined to allow elastic movement to create a seal which can be broken or released without encountering any wedging effects which can result in no flow.

The various flow instability phenomena of the above described vacuum actuated devices also create a discrepancy between delivery pressure and actuation pressure, where "delivery pressure" as used herein is intended to mean the pressure in the surrounding region 14 outside the bellows 13 and "actuation pressure" as used herein is intended to mean the pressure at which flow occurs across the gap created from the breaking of the seal contact of the stabber 12 and the thermoplastic seat 11. The inventive vacuum actuated device 10 by virtue, at least in part, of a thermoplastic material not susceptible to deformation or swelling, does not possess such a discrepancy between delivery pressure and actuation pressure, as will be demonstrated below in the Examples.

Figure 13A:
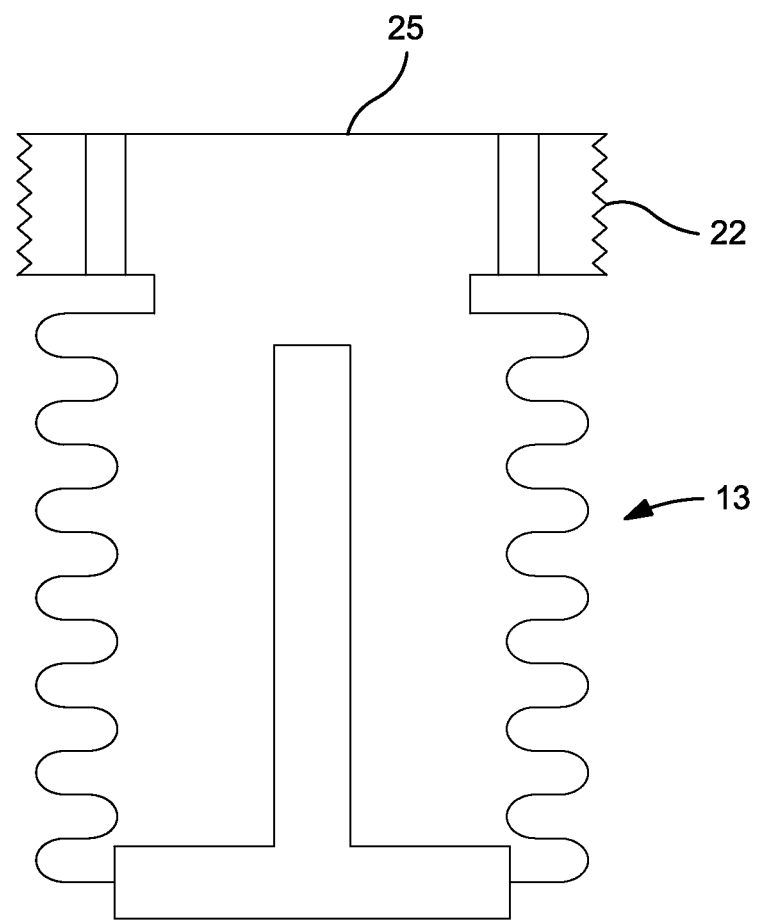
FIG. 13a shows a modified bellows assembly having threads situated along the sides of a wider top portion of a modified bellows and FIG. 13c show the modified threaded bellows assembly of FIG. 13a set and fixed within port body of valve head.
Figure 13B:
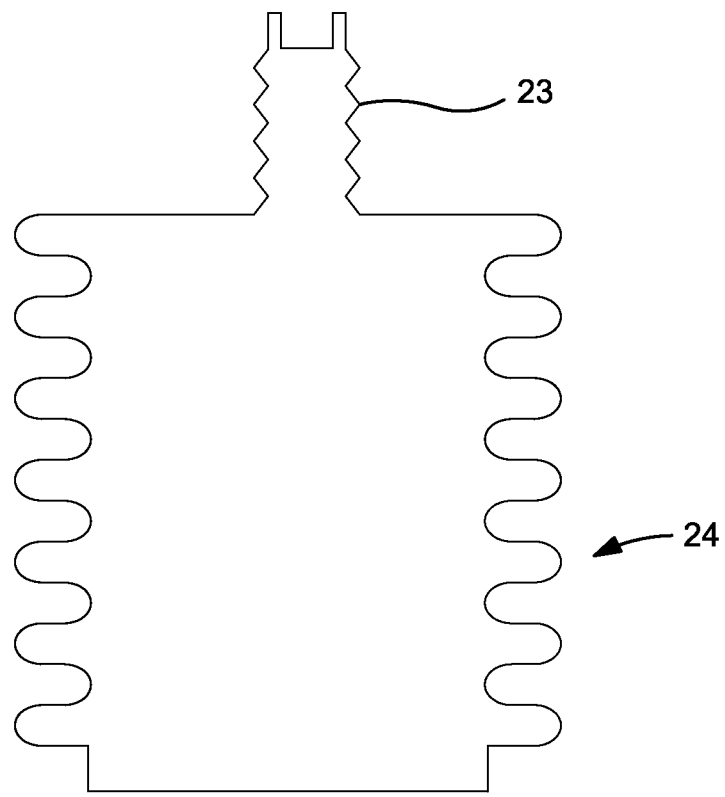
FIG. 13b shows a conventional bellows assembly having threads situated along the inner diameter of a conventional bellows having a narrower inner top portion, and FIG. 13d show the bellows assembly of FIG. 13a set and affixed within the port body of a valve head.
Figure 13C:
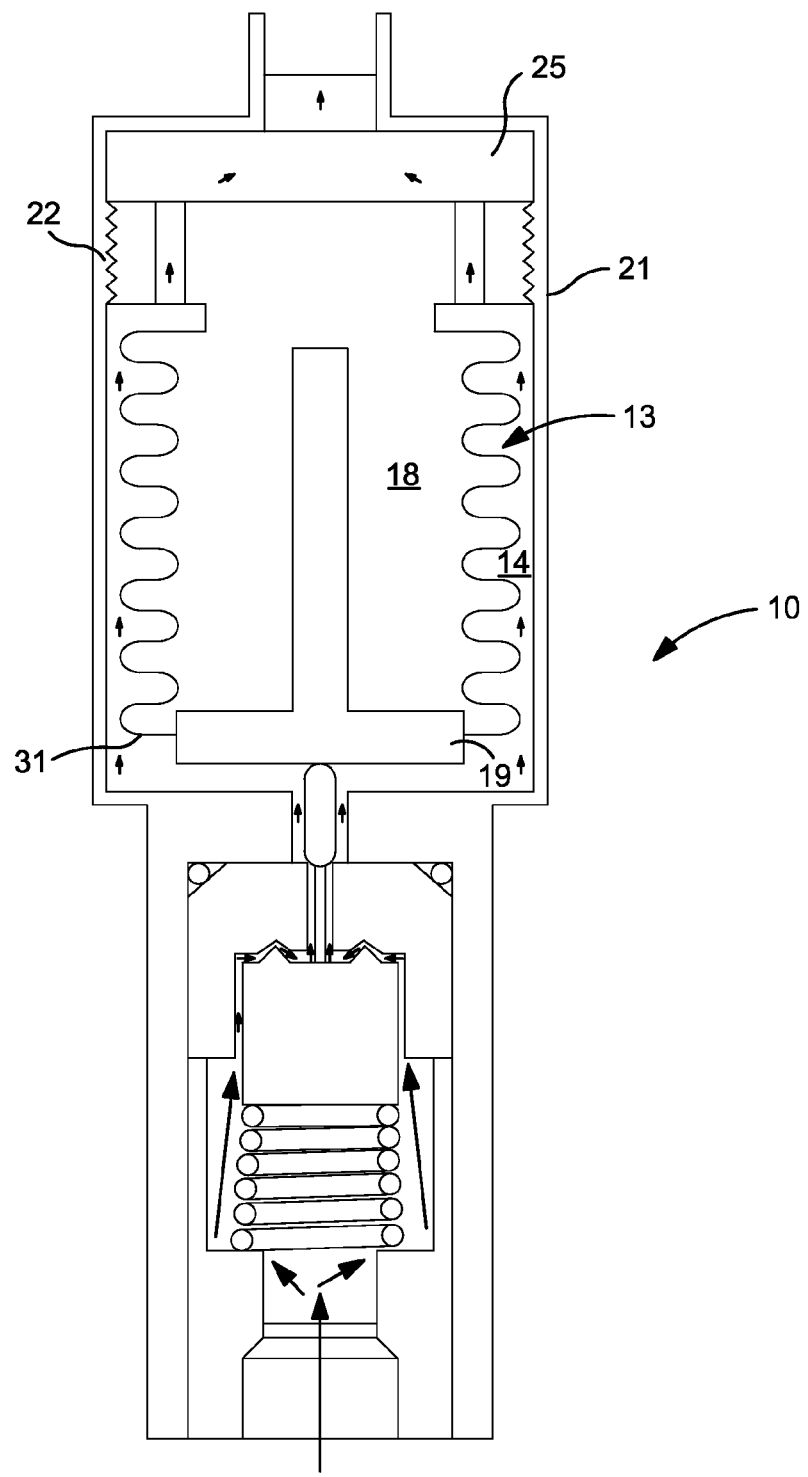
Figure 13D:
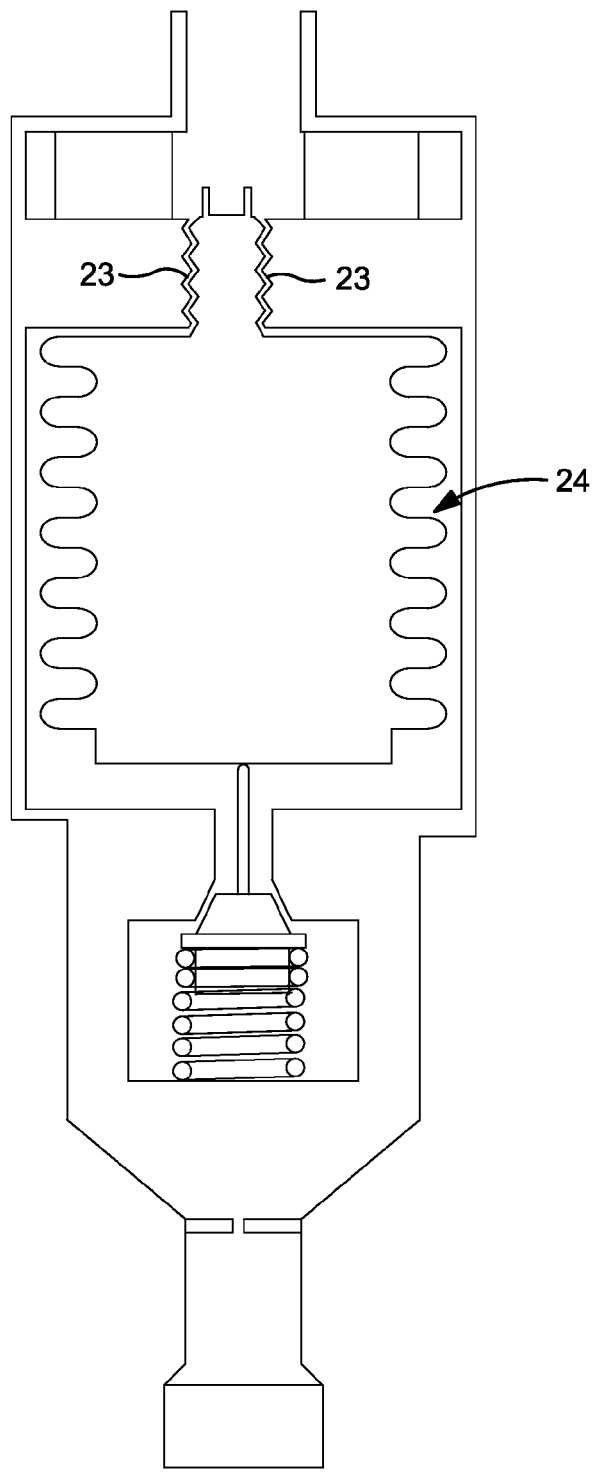

Preferably, the bellows 13 as has been described and shown in FIGS. 1*a*-1*c* is a modified bellows assembly to enhance the control of the delivery pressure. FIG. 13*a* shows the modified bellows assembly 13 having threads 22 situated along the sides of a wider top portion 25 of the modified bellows assembly 13, and FIG. 13*c* shows the modified threaded bellows assembly 13 of FIG. 13*a* set and fixed within the port body 21 of a valve head. The modified bellows 13 is defined at least in part by an enclosed chamber that is adapted to expand in response to a predetermined vacuum condition surrounding an outside region 14 of the bellows 13. The bellows 13 has a top portion 25 threadably engaged to a port body 21 along an outer diameter of the bellows 13. The bottom portion of the bellows 13 is defined by a contact plate 19. Referring to FIG. 13*a*, the threads 22 along the bellows 13 are configured to the vertical outer diameter of the wider top portion 25 of bellows 13, and the threads 22 are reduced in pitch, so as to contain more threads per inch. The result is greater control in delivery pressure in comparison to the bellows 24 of FIG. 13*b* incorporated into FIG. 13*d* and which is representative of the conventional designs (o-ring of FIG. 2 and the pin-poppet of FIG. 3) whereby the threads 23 of the bellows are situated along a centrally located inner portion of the bellows 24, and the threads 23 are visibly more coarse. The greater control in delivery pressure is attributed to the ability of the modified bellows 13 to be incrementally positioned in a vertical configuration so that expansion of the bellows 13 exerts the required downward force onto the pin 17 and stabber 12 to create the necessary gap for flow under predetermined vacuum conditions in the outside region 14 surrounding the bellows 13. Additionally, the change in location and smaller size of the threads (i.e. increased threads per inch), significantly reduces the tendency for the bellows assembly 13 to tilt away from its vertical axis during vertical positioning of the bellows 13. These features allow fine-tuning of the vertical positioning of the bellows 13 in manner that can achieve greater control of the downward force exerted by the expanded bellows 13 onto the stabber 12, thereby translating into greater delivery pressure control not previously attainable with conventional vacuum-actuated devices.

Referring to FIG. 13*c*, the modified bellows assembly 13 is threaded (clockwise or counterclockwise) within the port body 21 at a particular vertical position so as to set the appropriate delivery pressure with greater incremental control. The change in location and size of the threads 22 along the sides of a wider top portion 25 of the modified bellows 13 allows greater incremental control of the delivery pressure in comparison to the conventional bellows 24 of the o-ring (FIG. 2) and the pin-poppet (FIG. 3) designs. By example, referring to FIG. 13*c*, the modified bellows 13 when utilized in combination with the inventive vacuum actuated valve assembly 10 can significantly improve delivery pressure control such that one degree rotation of the bellows results in about 0.0005 inches change in the vertical position of the bellows 13 which results in a delivery pressure change of about 10 torr. In comparison, with regards to the conventional bellows assembly 24 (FIG. 13*b*) incorporated into a conventional vacuum actuated pin-poppet device (FIG. 13*d*), one degree rotation of the bellows 24 results in about 0.005 inches change in the bellows vertical position, which results in a delivery pressure change of about 100 torr. The present invention is capable of a 10 fold increase in delivery pressure control. The finer adjustment of delivery pressure by the present invention also allows significantly better reproducibility to ensure each of the vacuum actuated valves can be actuated to open and deliver at substantially the same pressure, thereby improving valve-to-valve consistency.

It should be understood that the present invention has versatility to be utilized for any type of application requiring sub-atmospheric flow of gases to an end-user site. By way of example, the present invention can be employed in semiconductor, LED, solar, flat panel display, aeronautical, aerospace and defense applications. It should also be understood that the novel sealing structure and mechanism can be incorporated into the other valve devices besides vacuum-actuated valve devices.

The present invention can be incorporated as part of any system for storage and delivery, such as a cylinder or other known vessels generally used for delivery of gases and fluids. Still further, the present invention can be employed in combination with any other suitable accessory typically utilized for delivery of fluids.

Other modifications are contemplated by the present invention. For example, the stabber top portion 16 may comprise other suitable geometries besides a frusto-conical shape that are designed to mate with the inner sealing surface of the seat 11. Additionally, the seat 11 may be formed from other suitable thermoplastic materials not susceptible to undesirable shape deformation during engagement and disengagement of the seal.

The novel structure of the sealing mechanism of the present invention translates into improved flow behavior performance when compared to conventional vacuum-actuated valve assemblies. In this regard, various tests were carried out with the conventional valves and the inventive valve to demonstrate the significantly improved flow behavior of the latter. The Comparative Examples and Examples below describe the testing. It should be apparent to those skilled in the art that the present invention is not limited by the examples provided herein, which have been provided to merely demonstrate the operability of the present invention.

Figure 4:
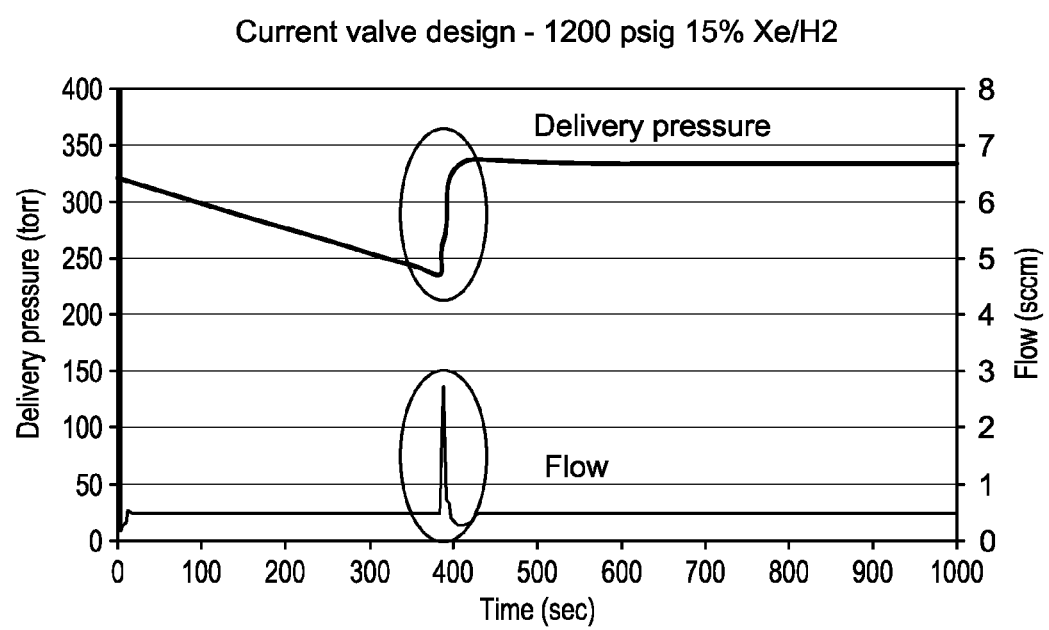
FIG. 4 is a graphical illustration of the opening behavior of a conventional vacuum actuated valve assembly as tested and described in Comparative Example 1.

Comparative Example 1 (O-Ring Design; 15% Xe—H2 at 1200 Psig; FIG. 4 Test)

A conventional vacuum actuated valve assembly was inserted into a gas sub-atmospheric delivery and high pressure storage cylinder. The conventional valve utilized was an O-ring design, as shown in FIG. 2. A flow test was conducted to evaluate the valve opening behavior of the valve assembly. A gas mixture of 15 vol % Xe and the balance hydrogen (Xe—H2) was filled into the cylinder so that the inlet pressure onto the valve assembly was 1200 psig. The cylinder was connected to a flow manifold, which included a mass flow controller and pressure transducer. The mass flow controller was located downstream of the outlet of the cylinder and was set at 0.5 sccm. The pressure transducer was placed between the outlet of the cylinder and the mass flow controller to measure the delivery pressure of the Xe—H2 gas mixture from the cylinder. A vacuum pump was located downstream of the mass flow controller and used to create a vacuum through the manifold.

The mass flow controller was regulated to allow 0.5 sccm to flow therethrough. From the start of the test at t=0 seconds until t=400 seconds, the vacuum actuated valve assembly was not actuated and remained closed, during which time the Xe—H2 flowing through the mass flow controller was being provided by the volume of residual gas contained in the manifold at the target flow rate of 0.5 sccm. At approximately 400 seconds into the test, the pressure in the manifold was reduced from about 325 torr to a pressure slightly below 250 torr, at which point the valve assembly was actuated into the open position, thereby releasing the Xe—H2. In other words, a greater vacuum was required to activate the valve assembly from the closed to the open position. When the valve opened, the delivery pressure in the manifold as measured by the pressure transducer instantaneously increased from about 250 torr to about 400 torr, thereby creating the delivery pressure spike shown in FIG. 4. This delivery pressure spike resulted in an overshoot in flow rate, as the mass flow controller was not able to immediately compensate for the sudden change in the delivery pressure upstream of the mass flow controller. The flow spiked from 0.5 sccm to above 2 sccm. Eventually, the mass flow controller was able to stabilize the flow rate back to 0.5 sccm, but only after a flow rate spike had occurred, as shown in FIG. 4. FIG. 4 shows that the flow rate spike of greater than 2 sccm occurred at approximately 400 seconds and after the delivery pressure spike. The circled regions in FIG. 4 illustrate this delivery pressure spike and corresponding flow rate spike behavior during opening of the valve. The flow spike was considered disruptive to the ion implanter and the deviation in the flow caused the ion implanter to shut down. When the delivery pressure stabilized to approximately 325-350 torr, the flow rate through the mass flow controller was observed to stabilize to its target of 0.5 sccm. FIG. 4 also indicates that the valve was observed to close at a pressure that was approximately 75 torr above the opening pressure at which delivery of the gas occurred.

The test demonstrated that the delivery pressure spike occurred as a result of a higher vacuum level required to open the valve. As a result, the gas flow rate upon the valve opening was greater and resulted in a flow spike.

Figure 5:
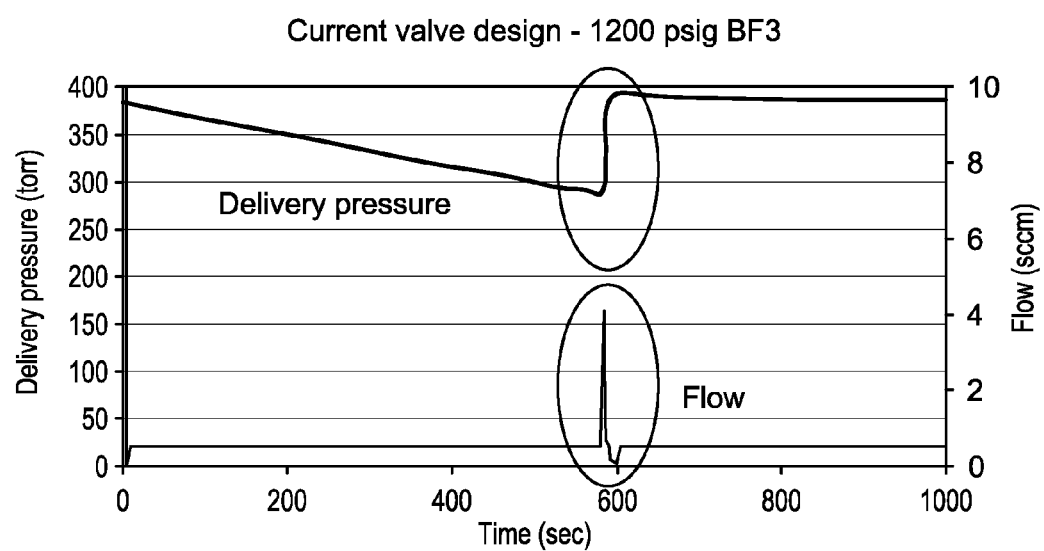
FIG. 5 is a graphical illustration of the opening behavior of a conventional vacuum actuated valve assembly as tested and described in Comparative Example 2.

Comparative Example 2 (O-Ring Design; BF3 at 1200 psig; FIG. 5 Test)

The conventional vacuum-actuated valve assembly as shown in FIG. 2 and tested in Comparative Example 1 was subject to the same flow test and conditions as in Comparative Example 1. However, BF3 was filled into the high pressure cylinder, as opposed to Xe—H2. The BF3 was filled into the cylinder so that the inlet pressure onto the valve assembly was 1200 psig.

The valve assembly remained closed, during which time the BF3 flowing through the mass flow controller was being provided by the volume of residual gas contained in the manifold at the target flow rate of 0.5 sccm for approximately the first 600 seconds of the test. Subsequently, the pressure in the manifold was reduced from about 400 torr to a pressure slightly below 300 torr, at which point the vacuum actuated valve assembly was actuated into the open position to release the BF3. In other words, a greater vacuum was required to activate the valve assembly from the closed to the open position. When the valve opened, the delivery pressure in the manifold as measured by the pressure transducer instantaneously increased from about 300 torr to about 400 torr, thereby creating the delivery pressure spike shown in FIG. 5. This delivery pressure spike resulted in an overshoot in flow rate (flow greater than 0.5 sccm), as the mass flow controller was not able to immediately compensate for the sudden increase in the delivery pressure upstream of the mass flow controller. As a result, the mass flow rate actually exceeded its target of 0.5 sccm. Eventually, the mass flow controller was able to stabilize the flow rate back to 0.5 sccm. FIG. 5 shows that the flow rate spike of up to about 4 sccm occurred at approximately 600 seconds and immediately after the delivery pressure spike. The circled regions in FIG. 5 illustrate this delivery pressure spike and corresponding flow rate spike behavior during opening of the valve. When the delivery pressure stabilized to approximately 400 torr, the flow rate through the mass flow controller was observed to stabilize to its target of 0.5 sccm. FIG. 5 also indicates that the valve was observed to close at a pressure that was approximately 75-100 torr above the opening pressure at which delivery of the gas occurred.

The test demonstrated that the delivery pressure spike occurred as a result of a higher vacuum level required to open the valve. As a result, the gas delivery pressure upon the valve opening was greater, which resulted in a flow spike. Prolonged BF3 exposure was concluded to absorb into the elastomeric o-ring material, thereby altering its shape, which was believed to contribute to the delivery pressure fluctuations.

Figure 6A:
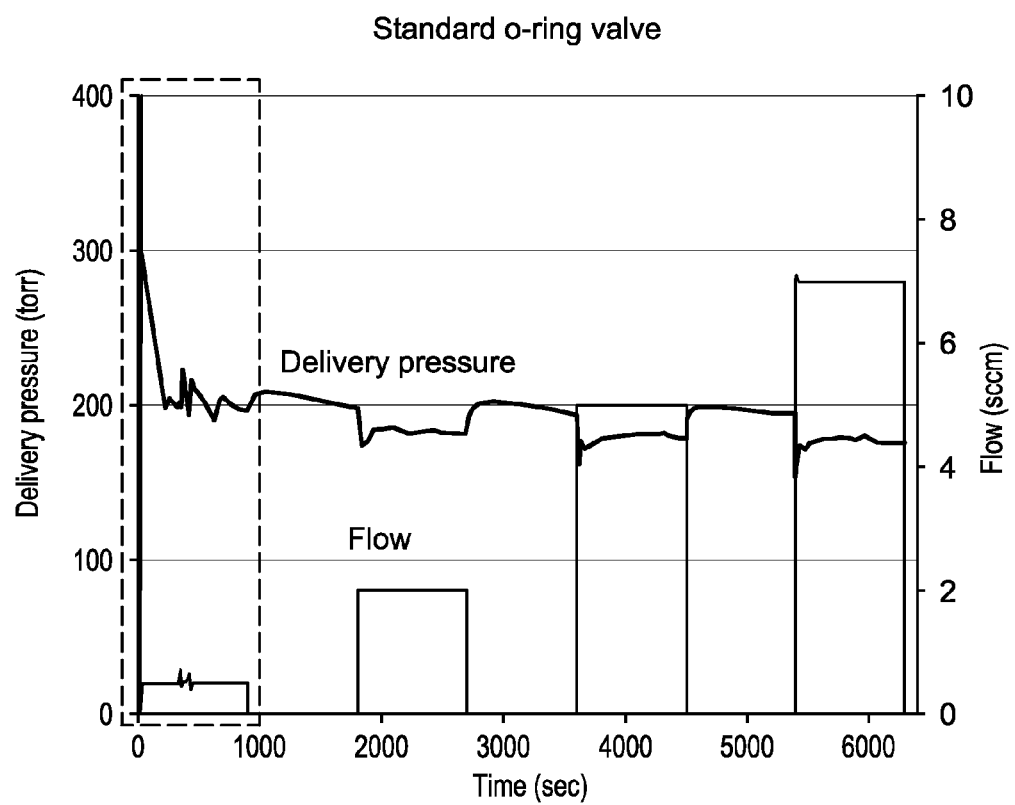
FIGS. 6a and 6b are a graphical illustration of the opening behavior of a conventional vacuum actuated valve assembly as tested and described in Comparative Example 3.
Figure 6B:
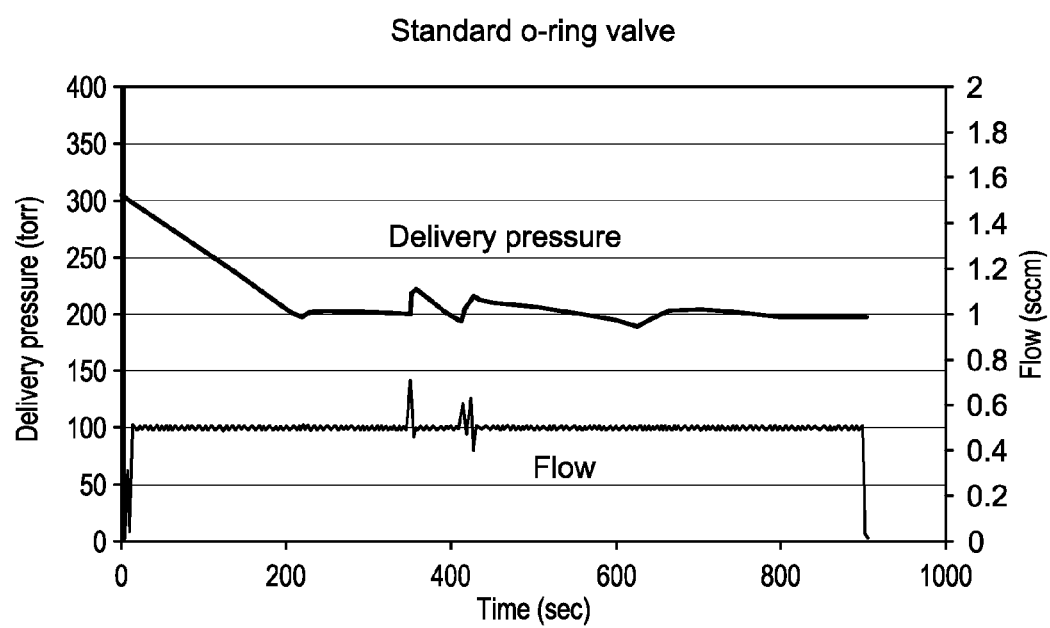

Comparative Example 3 (O-Ring Design; 40,000 Cycles+13 Day BF3 Hold at 1280 psig; FIGS. 6a and 6b Test)

A conventional o-ring designed vacuum actuated valve assembly was inserted into a gas sub-atmospheric delivery and high pressure storage cylinder, as shown in FIG. 2. The flow stability of the valve assembly was evaluated at a range of flow rates after subjecting the valve assembly to a series of various tests that included 40,000 open/close cycles followed by a 13 day hold of BF3 at 1250 psig and 104° F. A single open and closing of the valve assembly designated a single cycle. Each cycle was performed using BF3 gas.

The valve was opened and closed for 5000 cycles followed by conducting a run down test that consisted of flowing BF3 at 4 sccm from the cylinder at a pressure of 1250 psi until the cylinder approached an empty condition. This protocol was repeated until a total of 40,000 cycles were completed.

Next, flow tests were performed at 1250 psig BF3 and flow rates of 0.5, 2, 5 and 7 sccm followed by holding the pressurized BF3 within the cylinder for 13 days at 40° C. with 1250 psig BF3. The 13-day BF3 hold was designed to evaluate the impact of prolonged exposure of the conventional o-ring valve to BF3.

After each of the above tests was performed, the opening behavior of the o-ring valve was evaluated at various flow rates. In particular, referring to FIGS. 6*a* and 6*b*, sub-atmospheric flows through the mass flow controller occurred at 0.5, 2, 5 and 7 sccm. Delivery pressure and flow rates were monitored and data logged with the results shown in FIGS. 6A and 6B. FIG. 6A shows that the delivery pressure was erratic at each of the flow rates and never stabilized throughout the duration of the test, particularly with reference to the first 900 seconds. Delivery pressure spikes and fluctuations occurred throughout the duration of the test. FIG. 6B shows a blown-up view of FIG. 6A for the first 900 seconds of the test when flow through the mass flow controller was 0.5 sccm. The delivery pressure was particularly unstable at 200 torr, and the flow rate exhibited oscillations at 0.5 sccm. FIG. 6*b* indicates that the valve was observed to close at a pressure that was approximately 100 torr above the opening pressure at which delivery of the gas occurred.

The test verified that the o-ring valve assembly was unable to maintain stable flow behavior at any of the flow rates. It was concluded that prolonged exposure of BF3 adversely impacted the ability of the o-ring vacuum-actuated valve to dispense BF3 from the cylinder.

Comparative Example 4 (O-Ring Design of FIG. 2; Unstable Flow at 1500 psig)

The o-ring vacuum-actuated valve of FIG. 2 was inserted into a gas sub-atmospheric delivery and high pressure storage cylinder. The flow stability of the valve assembly at higher pressures than those in Comparative Example 1 was evaluated. Argon gas was filled into the high pressure cylinder so that the inlet pressure onto the valve assembly was 1500 psig. The same test configuration was utilized as in Comparative Example 1. Specifically, the cylinder was connected to a flow manifold as described in Comparative Example 1. In particular, the flow manifold included a mass flow controller and pressure transducer. The mass flow controller was located downstream of the outlet of the cylinder and was set at 2 sccm. The pressure transducer was placed between the outlet of the cylinder and the mass flow controller to measure the delivery pressure of the argon gas from the cylinder. A vacuum pump was located downstream of the mass flow controller and used to create a vacuum through the manifold.

The test indicated that the o-ring design created even greater flow instabilities in comparison to Comparative Example 1. Delivery pressure spikes upon opening of the o-ring valve resulted in erratic flow behavior during the test.

Comparative Example 5 (Pin-Poppet Design of FIG. 3; Wedge Effect Failure Mode; No Flow Achieved at 900 psig)

The pin-poppet vacuum-actuated valve of FIG. 3 was inserted into a gas sub-atmospheric delivery and high pressure storage cylinder. The flow stability of the pin-poppet valve was evaluated. Argon gas was filled into the high pressure cylinder so that the inlet pressure onto the valve assembly was 900 psig. The same test configuration was utilized as described in Comparative Example 4.

The pin-poppet did not actuate at any of the vacuum levels created during the test, thereby creating no flow. The test was representative of the common failure mode associated with the pin-poppet design in which the molded elastomer of the pin has a tendency to wedge so tight around the pin that the expansion of the bellows is unable to create enough thrust force to urge down the pin.

Figure 7:
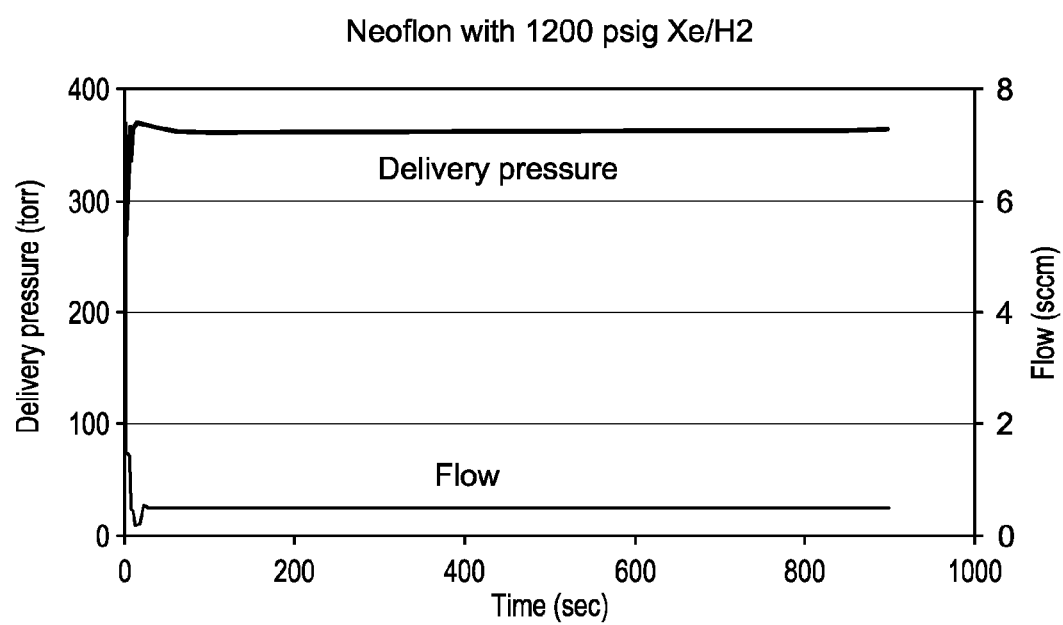
FIG. 7 shows a graphical illustration of the opening behavior of the modified vacuum actuated valve assembly of the present invention as described in Example 1.

Example 1 (Modified Valve Assembly; 15% Xe—H2 at 1200 psig; FIG. 7 Test)

The modified vacuum actuated valve assembly of the present invention, as shown in FIGS. 1*a*-1*c*, was inserted into a gas sub-atmospheric delivery and high pressure storage cylinder. A flow test was conducted to evaluate the valve opening behavior of the modified valve assembly. A gas mixture of 15% Xe and the balance hydrogen (Xe—H2) was filled into the cylinder so that the inlet pressure onto the valve assembly was 1200 psig. The cylinder was connected to a flow manifold that was configured identically as described in Comparative Examples 1 and 2. The flow test was performed under the same conditions as described in the Comparative Examples 1 and 2.

At approximately 50 seconds into the test, the modified valve assembly was actuated into the open position to dispense Xe—H2. FIG. 7 shows no delivery pressure spikes or oscillations occurred upon opening of the valve. As a result, the flow rate as measured by the mass flow controller remained steady at its target value of 0.5 sccm. No flow excursions were observed. FIG. 7 indicates that the valve was observed to close at a pressure that was only 20 torr above the opening pressure at which delivery of the gas occurred, which indicated sensitivity of the valve in contrast to the conventional valve assembly of Comparative Example 1-3.

The modified valve exhibited significantly improved flow stability when dispensing Xe—H2 in comparison to the conventional valve assembly tested in Comparative Example 1. Overall, the test demonstrated flow stability of the modified valve in contrast to the conventional o-ring valve (FIG. 2) and pin poppet valve (FIG. 3) assemblies which were tested.

Figure 8:
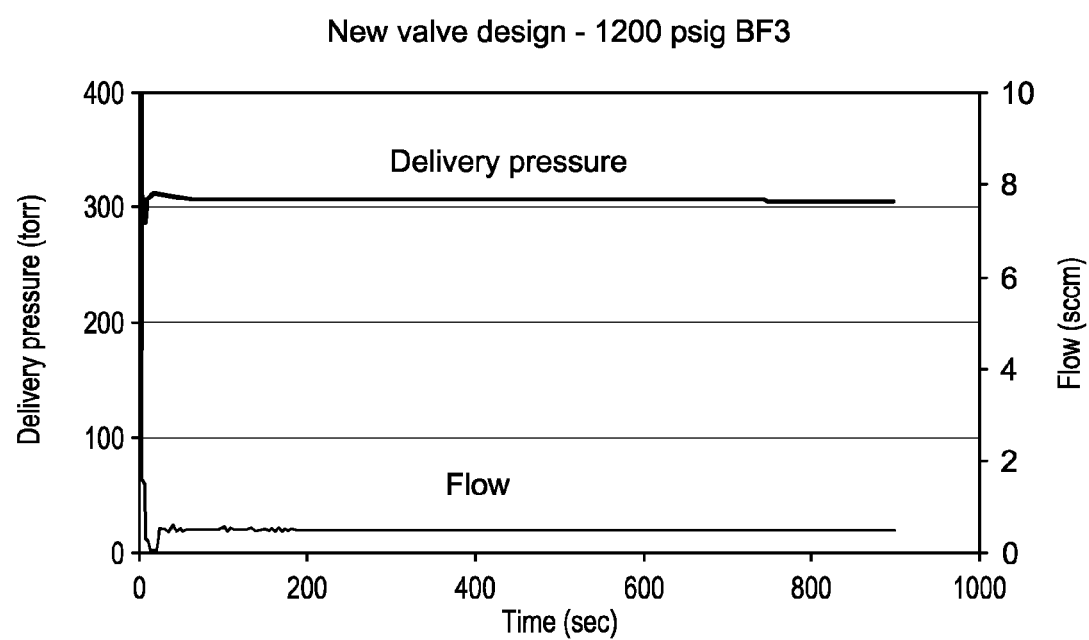
FIG. 8 shows a graphical illustration of the opening behavior of the modified vacuum actuated valve assembly of the present invention as described in Example 2.

Example 2 (Modified Design; BF3 at 1200 psig; FIG. 8 Test)

The modified vacuum actuated valve assembly of the present invention, as shown in FIG. 1, was inserted into a gas sub-atmospheric delivery and high pressure storage cylinder. A flow test was conducted to evaluate the valve opening behavior of the modified valve assembly utilizing the same protocol as in Comparative Example 2. BF3 gas was filled into the cylinder so that the inlet pressure onto the valve assembly was 1200 psig. The cylinder was connected to a flow manifold that was configured as in Comparative Examples 1 and 2 and Example 1. The flow test was performed under the same conditions as Comparative Examples 1 and 2 and Example 1.

At approximately 50 seconds into the test, the modified valve assembly opened. FIG. 8 shows no delivery pressure spikes occurred upon opening of the valve. As a result, the flow rate as measured by the mass flow controller remained steady at its target value of 0.5 sccm. The modified valve exhibited flow stability when dispensing BF3 in contrast to the conventional valve assembly tested in Comparative Example 2. FIG. 8 indicates that the valve was observed to close at a pressure that was only 20 torr above the opening pressure at which delivery of the gas occurred, which indicated sensitivity of the valve in contrast to the conventional valve assembly of Comparative Example 1-3.

The stable flow behavior exhibited by the test confirmed the absence of BF3 absorption into the Neoflon™ seat. As such, the Neoflon™ seat was not susceptible to undesirable shape deformation, which was a significant improvement over the flow tests performed with the o-ring valve design.

Overall, the test demonstrated the significant improved flow stability of the modified valve in comparison to the conventional o-ring valve (FIG. 2) and pin poppet valve (FIG. 3).

Figure 9A:
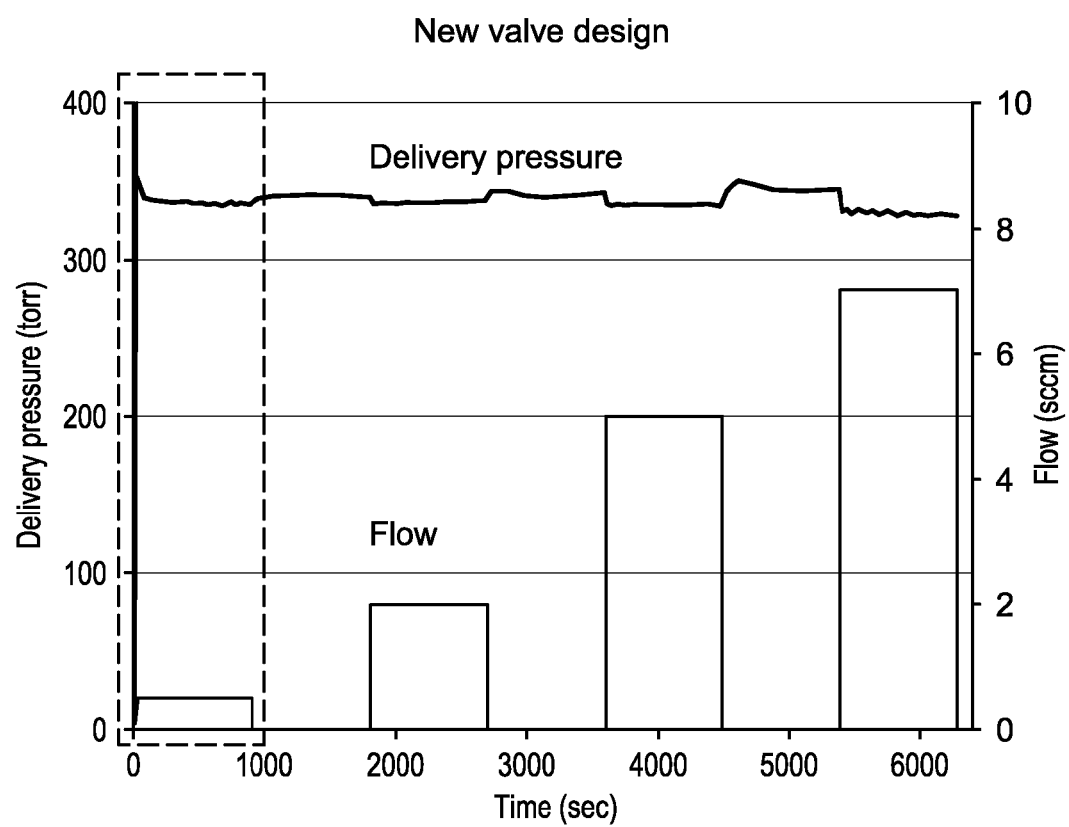
FIGS. 9a and 9b are a graphical illustration of the opening behavior of a conventional vacuum actuated valve assembly as tested and described in Example 3.
Figure 9B:
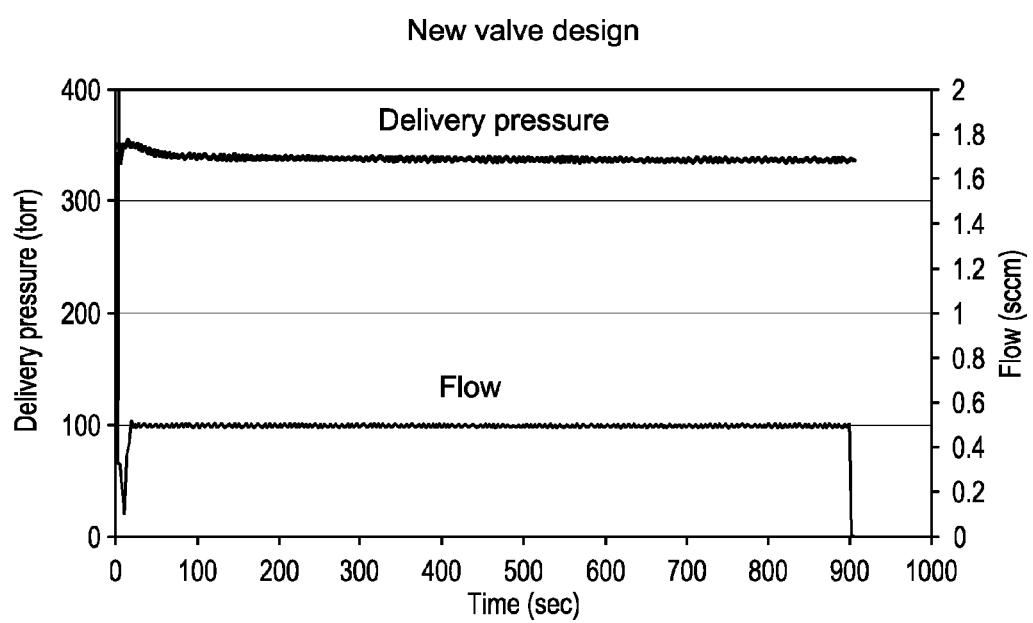

Example 3 (Modified Valve Assembly; 40,000 Cycles+13 Day BF3 Hold at 1280 psig; FIGS. 9A and 9B Test)

The modified vacuum actuated valve assembly of the present invention was inserted into a gas sub-atmospheric delivery and high pressure storage cylinder, as shown in FIG. 1. The flow stability of the valve assembly was evaluated at a range of flow rates after subjecting the valve assembly to the same conditions as in Comparative Example 3, namely a series of various tests which totaled 40,000 cycles followed by a 13 day hold of BF3 at 1250 psig and 104° F. A single open and closing of the valve assembly designated a single cycle. Each cycle was performed using BF3 gas. The valve was opened and closed for 5000 cycles followed by conducting a run-down test that consisted of flowing BF3 at 4 sccm from the cylinder at a pressure of 1250 psi until the cylinder approached an empty condition. This protocol was repeated until a total of 40,000 cycles were completed. Next, flow tests were performed at 1250 psig BF3 and flow testing from the cylinder at 0.5, 2, 5 and 7 sccm followed by holding the pressurized BF3 within the cylinder for 13 days at 40° C. with 1250 psig BF3. The 13-day BF3 hold was designed to evaluate the impact of prolonged exposure of the modified valve to BF3.

After each of the above tests was performed, the opening behavior of the modified valve was evaluated at various flow rates. In particular, referring to FIGS. 9A and 9B, sub-atmospheric flows through the mass flow controller occurred at 0.5, 2, 5 and 7 sccm. Delivery pressure and flow rates were monitored and data logged with the results shown in FIGS. 9A and 9B. FIG. 9A shows that the delivery pressure was stable at each of the flow rates. Delivery pressure spikes and fluctuations did not occur at any portion of the test. FIG. 9B shows a blown-up view of FIG. 9A for the first 900 seconds of the test when flow through the mass flow controller was 0.5 sccm. The delivery pressure remained stable at approximately 350 torr, and the flow rate exhibited no oscillations at the target value of 0.5 sccm. Additionally, the valve was observed to close at a pressure that was only 20 torr above the opening pressure at which delivery of the gas occurred, indicating sensitivity of the valve in contrast to the conventional o-ring valve assembly tested in Comparative Examples 1-3.

The test verified that the modified valve assembly was able to maintain stable flow behavior at all flow rates in contrast to the conventional vacuum actuated valve of Comparative Example 3. It was concluded that prolonged exposure of BF3 did not affect the ability of the modified vacuum-actuated valve to dispense BF3 from the cylinder.

Example 4 (Non-Failure Mode Test for Modified Valve Assembly at 1800 psig)

The modified valve assembly of the present invention was inserted into a gas sub-atmospheric delivery and high pressure storage cylinder, as shown in FIG. 1. The flow stability of the valve assembly at higher pressures was evaluated. A nitrogen gas was filled into the cylinder so that the inlet pressure onto the valve assembly was 1800 psig at 70° F. The cylinder was connected to a flow manifold as described in Comparative Example 1. The valve assembly was subject to 20,000 cycles. Each cycle consisted of the following. Nitrogen gas was flowed as a result of full vacuum supplied to the user port for 10 seconds to force the valve open. Next, atmospheric pressure was supplied to the user port for 35 seconds to force the valve closed. These parameters were selected to simulate harsh conditions not expected to be encountered during normal operation of the valve. At cycle 8000 and cycle 16000, the cycling was paused and the leak rate across the valve seat was measured. In both cases, the rate was on the order of 1e-7 atm-cc/sec helium, which is an order of magnitude lower than the leak rates caused by the pin poppet and o-ring valves before each was subject to valve cycling. Additionally, valve flow performance was evaluated before and after the 20,000 cycles using nitrogen gas and notwithstanding the harsh test conditions, no change in sub-atmospheric delivery performance was observed. The modified valve exhibited stable delivery behavior at 1800 psig. By comparison, such an elevated pressure was never attainable with either of the conventional designs (o-ring and pin-poppet). In fact, the inventors tested and observed that the pin poppet design has an upper pressure limit of approximately 750 psig while the o-ring design has an upper pressure limit of approximately 1500 psig. At these upper limits, the two designs either fail to deliver product or do so with random oscillations and spiking. The new modified valve design of the present invention was found to unexpectedly perform at elevated pressures of 1800 psig. Delivery pressure was stable for all cycles and stable flow behavior with no spikes was observed. No failure of the valve assembly occurred after 20,000 cycles. The test demonstrated that the valve was able to open and close on a repeated basis even when the inlet pressure onto the valve assembly was 1800 psig at 70° F.

The tests demonstrate that the inventive sealing structure and mechanism by which the seal is created creates superior flow stability not possible by the o-ring and pin-poppet vacuum actuated devices of FIGS. 2 and 3, respectively, which are considered representative of the conventional vacuum-actuated devices. Further, the novel sealing structure is capable of maintaining its structural integrity under prolonged exposure to toxic gases without undergoing undesirable shape deformation. This is in direct contrast to the o-ring design, which has been prone to o-ring swelling and deformation upon exposure to toxic gases, such as BF3. Further, the ability to eliminate detectable delivery pressure spikes and oscillations reduces the risk of end-user tool shutdown. Still further, the present invention eliminates the need for an external restricted flow orifice (RFO), as described in WO 2014047522, as a means to resolve pressure spiking behavior upon delivery of fluid.

It should be appreciated that the above valve and sealing mechanism can be incorporated in the form of a variety of embodiments, only a few of which have been illustrated and described above. While it has been shown and described what is considered to be certain embodiments of the invention, it will, of course, be understood that various modifications and changes in form or detail can readily be made without departing from the spirit and scope of the invention. It is, therefore, intended that this invention not be limited to the exact form and detail herein shown and described, nor to anything less than the whole of the invention herein disclosed and hereinafter claimed.

The invention claimed is:

1. A vacuum-actuated valve assembly, comprising:
a modified bellows defined at least in part by an enclosed chamber sealed to isolate said chamber from an outside region surrounding the bellows, said bellows comprising side regions configured to longitudinally expand in response to a predetermined vacuum condition surrounding the outside region of the bellows, said bellows having a top portion threadably engaged to a port body along an outer diameter of the bellows, and said bottom portion of the bellows substantially defined by a contact plate;
a pin having a top end extending towards the bottom portion of the bellows and a bottom end extending through an opening of a stationary thermoplastic seat and an opening in a top portion of a stabber to contact a surface of the stabber;
the stationary seat consisting essentially of a thermoplastic material and further wherein said thermoplastic seat is characterized by the absence of elastomeric material, said stationary seat comprising the opening extending from an outer surface of the seat to an inner sealing surface of the seat, said seat further comprising a grooved region extending along said inner sealing surface of said stationary seat;
the stabber comprising a body portion and the top portion each of which is situated within the interior of the stationary seat, said interior of the stationary seat defined, at least in part, by an inner diameter greater than an outer diameter of the top portion and an outer diameter of the body portion thereby creating a passageway between the stabber and the seat;
wherein said top portion of the stabber is engaged within said grooved region of the stationary seat so as to be maintained in mechanical engagement therealong when the bellows is in a non-expanded state, said engagement creating a seal that blocks the passageway and prevents the flow of fluid therethrough, thereby creating a closed configuration of the valve assembly;
wherein expansion of the bellows along the side regions in a longitudinal direction in response to the predetermined vacuum condition surrounding the outside region of the bellows increases the length of the side regions of the bellows by an incremental amount sufficient to urge the contact plate downward against the top end of the pin, thereby causing said bottom end of the pin to push down against the surface of the stabber and disengage the top portion of the stabber from within the grooved region along the inner sealing surface of the stationary seat, thereby mechanically disengaging the seal to unblock the passageway and create a gap between the top portion of the stabber and the inner sealing surface of the stationary seat to create an open configuration of the valve assembly for the fluid to pass therethrough.

2. The vacuum-actuated valve assembly of claim 1, wherein said top portion is a frusto-conical shape.

3. The vacuum-actuated valve assembly of claim 1 disposed within an interior of a storage and delivery device.

4. The vacuum-actuated valve assembly of claim 1, wherein said stationary seat remains substantially unaltered in shape during one or more cycles of transitioning between the open configuration and the closed configuration.

5. The vacuum-actuated valve assembly of claim 1, wherein a single revolution of the threaded bellows translates into a delivery pressure change of about 10 torr.

6. The vacuum-actuated valve assembly of claim 1, wherein said top portion of said stabber circumferentially extends along said inner sealing surface of said stationary seat.

7. The vacuum-actuated valve assembly of claim 1, wherein said fluid is a gas selected from the gaseous hydrides arsine ($AsH_3$), phosphine ($PH_3$), diborane (B2H6), hydrogen (H2) and halide boron triflouride ($BF_3$), silicon tetrafluoride ($SiF_4$), germanium tetrafluoride (GeF4), Selenium hexafluoride (SeF6), phosphorus trifluoride (PF3) and oxides carbon dioxide (CO2) and carbon monoxide (CO) as sources of arsenic (As), phosphorus (P), boron (B), silicon (Si) germanium (Ge), selenium and carbon.

8. The vacuum-actuated valve assembly of claim 1, wherein mechanically disengaging the seal to create the open configuration is characterized by an absence of detectable delivery pressure spikes as measured by a pressure transducer and flow excursions as measured by a flow controller.

9. The vacuum-actuated valve assembly of claim 1, wherein the delivery pressure is substantially the same as the actuation pressure.

10. The vacuum-actuated valve assembly of claim 1, wherein the open configuration of the valve assembly allows said fluid to flow to an end-user at flow rates ranging from about 0.1-10 sccm.

11. The vacuum-actuated valve assembly of claim 1, wherein said thermoplastic material is polychlorotrifluoroethylene (PCTFE).

12. The vacuum-actuated valve assembly of claim 1, wherein the gap between the top portion of the stabber and the inner sealing surface of the stationary seat is in a range of 0.0005 inches to 0.010 inches.

13. The vacuum-actuated valve assembly of claim 1, wherein said grooved region of the seat comprises a coined surface configured to elastically compress within a predetermined elastic-like zone upon engagement with the top portion of the stabber.

14. The vacuum-actuated valve assembly claim 13, wherein the elastic-like zone thickness ranges from about 1 microns to about 100 microns at an operating condition of 0 to 2000 psig.

15. A sealing structure and mechanism for a valve assembly, comprising:
a stationary seat consisting essentially of a thermoplastic material and further wherein said thermoplastic seat is characterized by the absence of elastomeric material;
the stationary seat comprising an opening extending from an outer surface of the stationary seat to an inner sealing surface of the stationary seat, said seat further comprising a grooved region extending along said inner sealing surface of said stationary seat;
said grooved region of the seat comprising a surface configured to compress within a predetermined zone upon engagement with a top portion of a stabber;
the stabber comprising a body portion and the top portion each of which is situated within the interior of the stationary seat;

the interior of the stationary seat defined, at least in part, by an inner diameter greater than an outer diameter of the top portion and an outer diameter of the body portion thereby creating a passageway between the stabber and the seat;

wherein said top portion of the stabber is adapted to move between a closed configuration and an open configuration, said closed configuration defined by said top portion of the stabber engaged within said grooved region of the stationary seat so as to be maintained in mechanical engagement therealong, said engagement creating a seal that blocks the passageway thereby creating a closed configuration of the valve assembly;

the open configuration defined by the top portion of the stabber disengaged from within said grooved region so as to be spaced away from the grooved region along the inner sealing surface of the stationary seat to unblock the passageway and create a gap between the top portion of the stabber and the inner sealing surface of the stationary seat to create an open configuration of the valve assembly.

16. The sealing structure and mechanism for a valve assembly of claim 15, wherein mechanically disengaging the seal from the closed configuration to create the open configuration is characterized by an absence of detectable delivery pressure spikes as measured by a pressure transducer and flow excursions as measured by a flow controller.

17. The sealing structure and mechanism for a valve assembly of claim 15, wherein the elastic-like zone thickness ranges from about 1 micron to about 50 microns at an operating condition of 200-400 torr.

18. The sealing structure and mechanism for a valve assembly of claim 15, wherein a delivery pressure is substantially the same as an actuation pressure.

19. The sealing structure and mechanism for a valve assembly of claim 15, wherein said thermoplastic material is formed from polychlorotrifluoroethylene (PCTFE).

20. The sealing structure and mechanism for a valve assembly of claim 15, said grooved region of the seat comprises a coined surface configured to elastically compress within a predetermined elastic-like zone upon engagement with the top portion of the stabber.

21. The sealing structure and mechanism for a valve assembly of claim 15, wherein said top portion has a frusto-conical shape.

22. The sealing structure and mechanism for a valve assembly of claim 15, wherein said top portion extends away from the body portion and terminates as a circular-ring-like structure.

* * * * *